US006961872B2

(12) United States Patent
Yamamoto et al.

(10) Patent No.: US 6,961,872 B2
(45) Date of Patent: Nov. 1, 2005

(54) MICROCOMPUTER AND DEBUGGING SYSTEM

(75) Inventors: Osamu Yamamoto, Tokyo (JP); Shunichi Iwata, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 511 days.

(21) Appl. No.: 10/193,325

(22) Filed: Jul. 12, 2002

(65) Prior Publication Data

US 2003/0046610 A1 Mar. 6, 2003

(30) Foreign Application Priority Data

Sep. 3, 2001 (JP) ............................ 2001-266245

(51) Int. Cl.[7] ............................................... G06F 11/00
(52) U.S. Cl. .......................................... 714/34; 714/45
(58) Field of Search ............................. 714/34, 30, 28, 714/45, 37; 703/28

(56) References Cited

U.S. PATENT DOCUMENTS 5,724,505 A * 3/1998 Argade et al. ................ 714/45
6,397,354 B1 * 5/2002 Ertekin ........................ 714/34
6,732,307 B1 * 5/2004 Edwards ..................... 714/724
6,760,867 B2 * 7/2004 Floyd et al. .................. 714/39
6,826,747 B1 * 11/2004 Augsburg et al. ........... 717/128
6,839,869 B2 * 1/2005 Doi et al. ..................... 714/45

FOREIGN PATENT DOCUMENTS

JP 4-283842 10/1992
JP 10-275092 10/1998
JP 11-024959 1/1999

OTHER PUBLICATIONS

Nikki Electronics, Jul. 31, 1995, pp. 133-140.
Design Wave Magazine, Feb. 2000, pp. 38-45.

* cited by examiner

*Primary Examiner*—Robert Beausoliel
*Assistant Examiner*—Marc Duncan
(74) *Attorney, Agent, or Firm*—Buchanan Ingersoll PC

(57) ABSTRACT

A microcomputer according to the present invention includes: collecting unit for generating and collecting a series of trace information for each execution process of a program to be evaluated in a preset sampling period for a predetermined number of repetitions; outputting circuit for outputting the series of the trace information for each repetition; and decimating circuit for deleting any of the trace information collected at each repetition so that the outputting circuit can output all of the trace information to be collected within the sampling period when the collecting circuit has finished repetitive collection process.

14 Claims, 14 Drawing Sheets

FIG.6
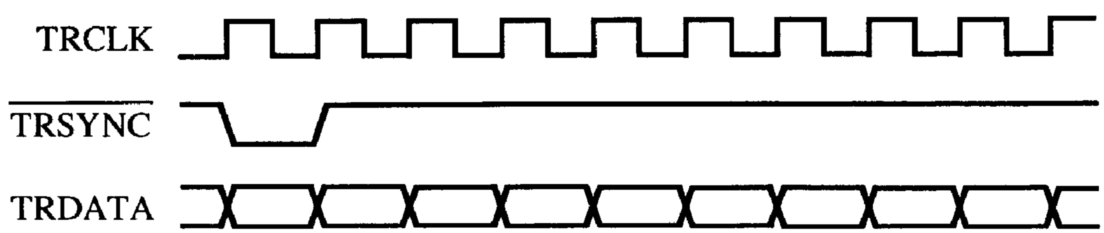
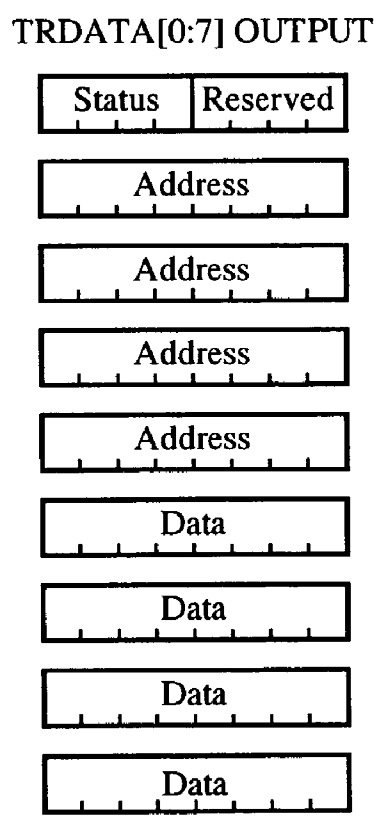

FIG.8

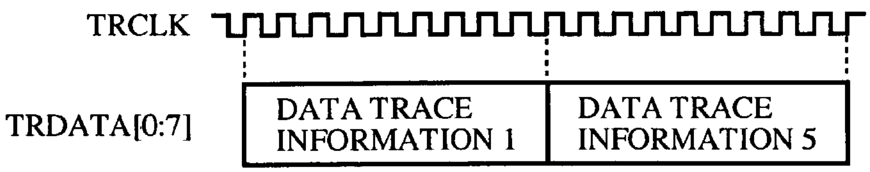

FIG.9

| TRACE NUMBER | TRACE INFORMATION |
|---|---|
| 1 | DATA TRACE INFORMATION 1, DATA TRACE INFORMATION 5 |
| 2 | BRANCH TRACE INFORMATION 2, BRANCH TRACE INFORMATION 6 |
| 3 | BRANCH TRACE INFORMATION 3 |
| 4 | BRANCH TRACE INFORMATION 4 |

FIG.10

| |
|---|
| FIRST INFORMATION (TRACE NO. 1) |
| FIRST INFORMATION (TRACE NO. 2) |
| FIRST INFORMATION (TRACE NO. 3) |
| FIRST INFORMATION (TRACE NO. 4) |
| SECOND INFORMATION (TRACE NO. 1) |
| SECOND INFORMATION (TRACE NO. 2) |
| SECOND INFORMATION (TRACE NO. 3) |
| SECOND INFORMATION (TRACE NO. 4) |
| ⋮ |

MICROCOMPUTER AND DEBUGGING SYSTEM

BACKGROUND OF THE INVENTION

1. Field of the Invention

The present invention relates to a microcomputer that is effective for debugging in a real working environment, and more particularly, it relates to a microcomputer that collects trace information at a plurality of times in a debugging operation while decimating it at a predetermined time period as well as a debugging system for controlling the debugging by the microcomputer and a method for collecting such trace information.

2. Description of Related Art

Upon development of a microcomputer system, verification of its operation and debugging of its software may be commonly performed by a so-called debugger, which is a development support device using any debugging tool such as an ICE (In-Circuit Emulator). The ICE comprises features for substituting for a CPU or a program memory to be developed and for debugging programs and hardware efficiently. For example, such features may include a real-time trace feature that verifies executing conditions in real time, a break feature that stops running at a given address, a single-step feature, a feature for setting data in a register, and the like.

Further, the ICE has a memory mapping feature that stores a program under development on its own memory instead of memory on the microcomputer system to verify the operation of the program. It allows debugging of the program and hardware while executing the developed program both on the ICE main unit and on the system to be evaluated, enabling efficient debugging work.

However, there have been appeared various problems with using the debugger comprising the above ICE, as a result of the fact that working frequencies of microcomputers have increased and that, at present, a CPU, a memory element and peripheral feature blocks may be often contained in one chip with advancement of LSI higher integration technology.

More specifically, for example, increase of a working frequency of a microcomputer may cause delay in signal transmission between the ICE main unit and the microcomputer to be evaluated, which may interfere with real-time trace. In particular, signal delay in a path between the ICE main unit and the microcomputer to be evaluated or in a buffer that stores trace information read out from the microcomputer by the ICE may significantly affect the real-time trace. Consequently, it becomes more difficult to perform the real-time trace that monitors access by the CPU to an external bus at the clock frequency at which the actual microcomputer runs.

In addition, miniaturization and diversification of microcomputers with advancement of LSI higher integration technology affect prices of probes that connects the ICE main unit to a printed circuit board on which the microcomputer to be evaluated is installed. For example, even a microcomputer having same architecture may have different number of pins and different circuit arrangement if its peripheral features are implemented by different circuits, thereby necessitating development of corresponding probes. Further, by miniaturization of microcomputers, it becomes necessary to use expensive adaptors to connect the above probes, which may cause cost-related problems.

As means for solving the above problems, a debugging system has been developed, wherein a debugging feature is incorporated in a microcomputer itself and exchanges debugging information with a debugger via pins dedicated for debugging. An example of such debugger is a microcomputer that is compliant with JTAG (Joint Test Action Group) in which a debugging feature is incorporated.

In the microcomputer compliant with JTAG, shift registers called cells are arranged between an internal logic circuit and each pin, which can monitor signals passing there or inject any data into the signals. Thus, the cells have features equivalent to those of the test probes in conventional testing methods.

FIG. 14 is a diagram schematically showing a configuration of a conventional debugging system as mentioned above, wherein the debugging features are incorporated in the microcomputer compliant with JTAG. In this figure, there is shown a host computer 100 for controlling a debugging tool 101, which can perform various configuration settings for debugging and which sends setting information to the debugging tool 101. The debugging tool 101 exchanges debugging information and trace information with a microcomputer with built-in debugging features 103 via pins that are dedicated for debugging and compliant with JTAG. The pins dedicated for debugging include five JTAG interface pins consisting of a TCK pin (a clock input pin) specified by IEEE 1149.1, a TDI pin (a pin for serially inputting test instruction code or test data), a TDO pin (a pin for serially outputting test instruction code or test data), a TMS pin (a pin for inputting selection of a test mode that controls state transition in a logic circuit to be evaluated in the microcomputer 103), and a TRST pin (a pin for inputting test reset that asynchronously initializes the logic circuit to be evaluated in the microcomputer 103).

Besides, there are pins to output signals from a debugging features block 106 to the debugging tool 101 including a TRCLK pin (a trace clock pin for outputting trace clock signals from the debugging features block 106 to a debugger 102), a TRSYNC pin (a trace synchronization pin for outputting a signal that indicates a leading location of a packet constituting trace information), and a TRDATA pin (a trace outputting pin for outputting the trace information). The debugger 102 equates to a configuration consisting of the host computer 100 and the debugging tool 101. The microcomputer with built-in debugging features 103 comprises the debugging features block 106 that provides the debugging features as well as a CPU 104 and a memory-peripheral features block 105 in one chip. Further, there are shown the CPU 104 for the microcomputer 103, the memory-peripheral features block 105 for the microcomputer 103, and the debugging features block 106 that performs debugging under control of the debugger 102.

FIG. 15 is a block diagram showing a configuration of the microcomputer with built-in debugging features 103 in FIG. 14. In this figure, a jump requesting signal 104*a* is output from the CPU 104 to a trace controlling section 109 to specify a branch-target address according to a branch instruction executed by the CPU 104. An executed instruction size signal 104*b* is output from the CPU 104 to the trace controlling section 109 to specify size of an instruction executed from the previous branch. A JTAG controlling section 107 that controls the debugging features by communicating with the debugging tool 101 via the JTAG interface is comprised of control registers that is related to debugging and accessible via the JTAG interface, a TAP (Test Access Port) controller that controls access via the JTAG interface, and the like. Trace trigger generating unit 108 generate a trace start signal 108*a*, a trace end signal 108*b* and data access detection signal 108*c* for controlling trace operation of the trace controlling section 109. The trace start signal 108*a* instructs the trace controlling section 109 to start outputting trace information, the trace end signal 108*b* instructs the trace controlling section 109 to finish outputting the trace information, and the data access detection signal 108*c* specifies the address that the CPU 104 has accessed and the data read therefrom or written thereto. The trace controlling section 109 generates the trace information that traces an internal state of the microcomputer 103 and outputs it to the debugging tool 101, and an address bus 110*a* and a data bus 110*b* transfer address signals and data in the microcomputer 103, respectively. It is to be noted that elements similar to those in FIG. 14 are given like reference numerals and description of these elements is thus omitted.

FIG. 16 is a block diagram showing a configuration of the trace controlling section in FIG. 15. In this drawing, a trace controlling circuit 111 receives trace-related information from outside and controls trace operation. A latch signal 111*a* is generated by the trace controlling circuit 111 to allow a buffer 113 to latch the address on the address bus 110*a* and data on the data bus 110*b*. An output controlling section 112 controls outputs from the trace controlling section 109 and outputs the trace clock signal TRCLK, the trace synchronization signal TRSYNC and the trace output TRDATA to the debugging tool 101. The buffer 113 latches information from the address bus 110*a* and the data bus 110*b* to create the trace information. A FIFO buffer 114 constitutes the output controlling section 112 and outputs the trace information in a predetermined bit unit from the buffer 113 to the debugging tool 101. Here, it is also to be noted that elements similar to those in FIG. 14 and FIG. 15 are given like reference numerals and description of these elements is omitted.

Next, the operation of the conventional debugging system will be described.

Here, a case will be described wherein execution of a program by the CPU 104 in the microcomputer with built-in debugging features 103 is traced in real time. First, as shown in FIG. 14, the microcomputer 103 is connected to the debugging tool 101 via the pins dedicated for debugging and compliant with JTAG. Then, the user uses the debugger 102 to download the program to be evaluated, which is stored on the memory-peripheral features block 105 in the microcomputer 103. It allows the user to determine trace conditions for the above program to be evaluated and make settings of the trace-related information according to the above conditions using the host computer 100. For example, when the CPU 104 executes the program to be evaluated, address information, which is stored in the memory space of the microcomputer 103 and acts as a trigger to start or end collection of the trace information and so on, is configured. This information is sent to the debugging tool 101 by the host computer 100.

The debugging tool 101 sets the above information via the pins dedicated for debugging and compliant with JTAG on a trace register (not shown) that is one of cells in the JTAG controlling section 107. The CPU 104 in the microcomputer 103 executes the program to be evaluated in response to an instruction from the debugger 102. At this time, the CPU 104 outputs the above information set in the trace register to the trace trigger generating unit 108 via the buses 110*a*, 110*b*. Using this information, the trace trigger generating unit 108 generates the trace start signal 108*a*, the trace end signal 108*b* and the data access detection signal 108*c* and outputs them to the trace controlling section 109.

In the trace controlling section 109, the trace controlling circuit 111 therein asserts the above trace start signal 108*a* to start outputting the trace information. More specifically, for example, when the CPU 104 executes a branch instruction in the above program to be evaluated, it generates the jump requesting signal 104*a* that specifies the branch-target address and the executed instruction size signal 104*b* that specifies the size of the instruction executed from the previous branch and outputs them to the trace controlling circuit 111. The trace controlling circuit 111 asserts the jump requesting signal 104*a* to output the latch signal 111*a* to the buffer 113. It allows the branch-target address to be taken in the buffer 113 via the address bus 110*a*. At this time, the trace controlling circuit 111 outputs the executed instruction size signal 104*b* to the buffer 113.

From the executed instruction size signal 104*b*, the trace controlling circuit 111 acquires the size of the instruction executed from the previous branch and sets it in the buffer 113. It allows the branch-target address to be taken in the buffer 113 from the address bus 110*a* sequentially, and therefore the branch trace information that traces each branch-target address and the size of the instruction executed from the previous branch in execution process of the program to be evaluated in the CPU 104 is generated. By outputting the branch-target address and the size of the instruction executed from the previous branch, the branch-source address and the branch-target address of the program can be notified. The branch trace information is output from the buffer 113 to the FIFO buffer 114. Then, the output controlling section 112 outputs the branch trace information in the FIFO buffer 114 by 8 bits at a time to the debugging tool 101 via the TRDATA pin. The output controlling section 112 also outputs the trace clock signal (TRCLK) as well as the trace synchronization signal (TRSYNC) that indicates a leading location of a packet constituting the branch trace information to the debugging tool 101 via respective pins.

On the other hand, when the trace controlling circuit 111 asserts the above data access detection signal 108*c*, it outputs the latch signal 111*a* to the buffer 113. At this time, via the address bus 110*a* and the data bus 110*b*, the address accessed by the CPU 104 as well as the data read therefrom and written thereto is acquired by the buffer 113 and then the data trace information comprised of the accessed address and the corresponding data is created. The data trace information is output from the buffer 113 to the FIFO buffer 114.

After that, the output controlling section 112 outputs the data trace information in the FIFO buffer 114 by 8 bits at a time to the debugging tool 101 via the TRDATA pin. The output controlling section 112 also outputs the trace clock signal (TRCLK) as well as the trace synchronization signal (TRSYNC) that indicates a leading location of a packet constituting the branch trace information to the debugging tool 101 via respective pins.

Finally, when the trace controlling circuit 111 asserts the above trace end signal 108*b*, it stops outputting the latch signal 111*a* to the buffer 113 to stop outputting the trace information.

As described above, the debugger 102 can acquire execution sequence and data access sequence of the evaluated program by the CPU 104 in the microcomputer 103 in real time from the branch trace information and the data trace information. By utilizing such information, the debugger 102 can debug the microcomputer in real time.

The conventional microcomputer of the above-described construction has such a problem that the trace information may not be output fully in case of successive branches and the like, in other words, a so-called overflow of the trace information may occur, thereby adversely affecting the real-time trace of the program.

The above problem will be described more specifically. For example, assuming that one unit of the trace information is comprised of 72 bits and the debugging features block 106 outputs the above trace information by 8 bits at a time from the TRDATA pin, it takes 9 clocks to output the one unit of the trace information. Here, if new branch occurs within 9 clocks after the immediately proceeding branch, the branch-target address of the newly created branch trace information is output from the buffer 113 to the FIFO buffer 114 while the previous branch trace information including the immediately proceeding branch-target address is still output from the FIFO buffer. Consequently, the immediately proceeding branch-target address is overwritten by the new branch-target address of the next created branch, and as a result, both of the address information can not be output in a complete form.

In this regard, it may be contemplated to solve this problem by increasing the outputting speed of the trace information by the debugging features block 106. However, it is difficult to increase the trace clock (TRCLK) frequency in comparison with acceleration of access of the CPU 104 to the memory-peripheral features block 105, because the trace information is output via the external pin (TRDATA pin).

Further, it may be also contemplated to output the trace information in parallel by using multiple external pins (TRDATA pins), but it is not appropriate because it may increase a cost of the microcomputer 103 and moreover restrict miniaturization of its size.

SUMMARY OF THE INVENTION

The present invention has been made to solve the above problems and is intended to obtain a microcomputer and a debugging system as well as a method for collecting its trace information that can eventually acquire the trace information without overflow by collecting the trace information over plural times at predetermined intervals with decimation.

The microcomputer according to the present invention includes: collecting means for generating and collecting a series of trace information for each execution process of a program to be evaluated in a preset sampling period for a predetermined number of repetitions; outputting means for outputting the series of the trace information for each repetition; and decimating means for deleting any of the trace information collected at each repetition so that the outputting means can output all of the trace information to be collected within the sampling period when the collecting means has finished repetitive collection process.

Due to this construction, there is an effect that the microcomputer may be obtained to acquire the trace information without overflow and without predicting the quantity of generated trace information.

The debugging system according to the present invention controls debugging for the microcomputer that includes: collecting means for generating and collecting a series of trace information for each execution process of a program to be evaluated in a preset sampling period for a predetermined number of repetitions; outputting means for outputting the series of the trace information for each repetition; and decimating means for deleting any of the trace information collected at each repetition so that the outputting means can output all of the trace information to be collected within the sampling period when the collecting means has finished all of repetitive collection process.

This system as constructed as mentioned above includes: trace information reconstructing means for keeping the series of the trace information output from the outputting means for each repetition sequentially and for sorting the series of the information in an original generating order to construct the trace information which is to be collected over said sampling period entirely; and debug controlling means for reading and/or configuring information about collection of the trace information for each means in the microcomputer and controlling debugging of the microcomputer using the trace information.

Due to this construction, there is an effect that the microcomputer may be obtained that can eliminate overflow of the trace information without predicting the quantity of the generated trace information and at the same time reconstruct given trace information from each of the trace information collected a plurality of times in a split manner regardless of the number of trace repetition, and therefore collect the trace information without overflow and without need to add the number of trace information output pins or increase operating frequency of the trace clock signal to speed up.

BRIEF DESCRIPTION OF THE DRAWINGS

FIG. 6 is a diagram showing output timing and a format of data trace information by the trace controlling section in FIG. 2;

FIG. 8 is a diagram showing output timing of the trace information in a trace for the first time;

FIG. 9 is a diagram showing relationship between the number of traces and the trace information;

FIG. 10 is a diagram describing reconstruction of the trace information that should be acquired in a real-time trace;

DETAILED DESCRIPTION OF THE PREFERRED EMBODIMENTS

Hereinafter, preferred embodiments of the present invention will be described with reference to drawings.

(First Embodiment)

Figure 1:
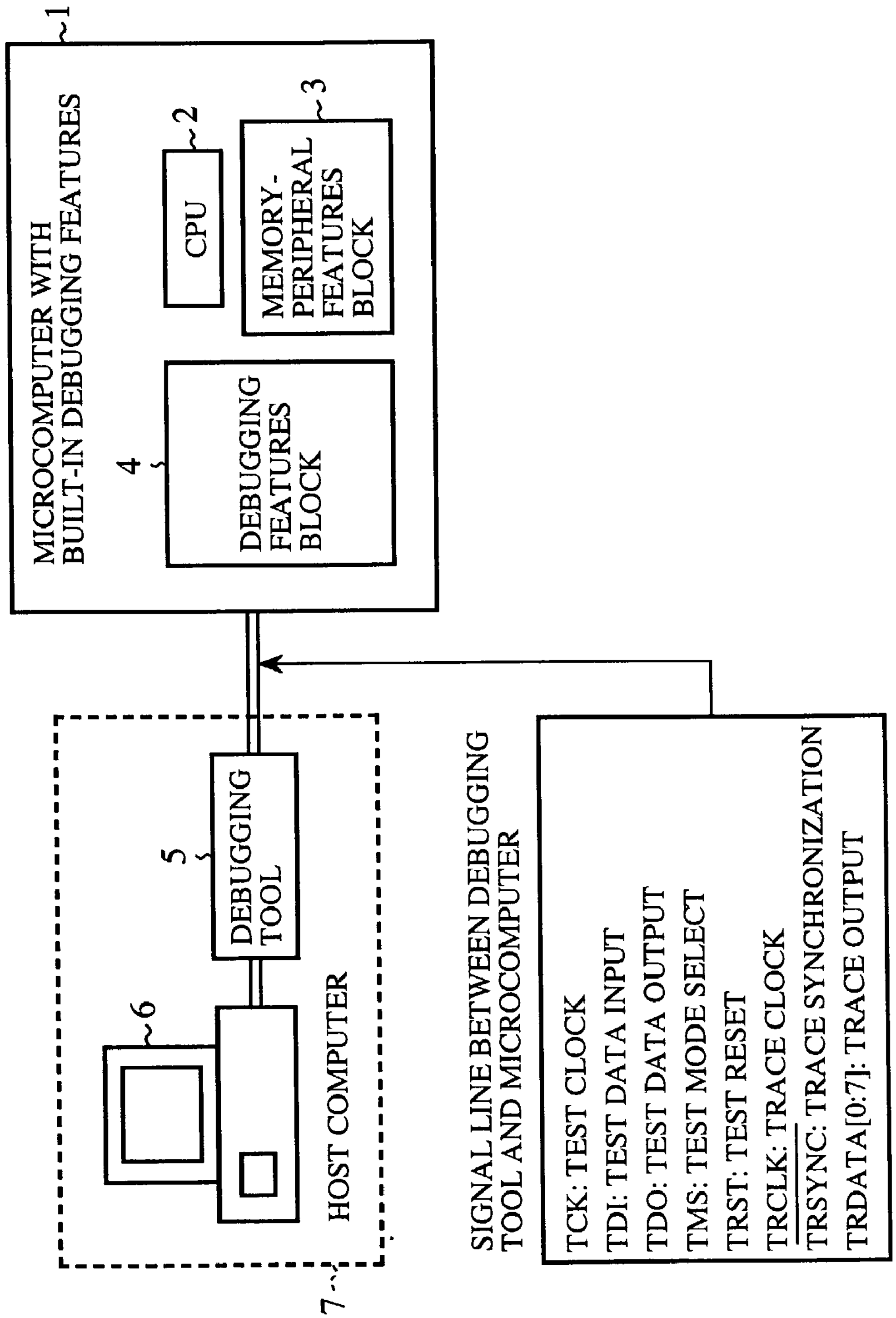
FIG. 1 is a diagram schematically showing a configuration of a debugging system according to a first embodiment of the present invention.

FIG. 1 is a diagram schematically showing a configuration of a debugging system according to a first embodiment of the present invention. In this figure, a microcomputer with built-in debugging features 1 used in the debugging system according to the first embodiment consists of one chip in which a CPU 2 and a memory-peripheral features block 3 as well as a debugging features block 4 that provides debugging features are formed. The CPU 2 in the microcomputer 1 executes a program to be evaluated that is stored in, for example, the memory-peripheral features block 3. The memory-peripheral features block 3 in the microcomputer 1 includes built-in peripheral I/O such as, for example, a built-in SRAM, a DMA controller, an interrupt controller, a timer and the like. The debugging features block 4 debugs under the control of a debugging tool 5. The debugging tool (debug controlling means) 5 exchanges debug-related information and trace information with the microcomputer with built-in debugging features 6 via pins dedicated for debugging and compliant with JTAG.

The pins dedicated for debugging include five JTAG interface pins consisting of a TCK pin specified by IEEE 1149.1 (a clock input pin), a TDI pin (a pin for serially inputting test instruction code or test data), a TDO pin (a pin for serially outputting test instruction code or test data), a TMS pin (a pin for inputting selection of a test mode that controls state transition in a logic circuit to be evaluated in the microcomputer 1), and a TRST pin (a pin for inputting test reset that asynchronously initializes the logic circuit to be evaluated in the microcomputer 1).

Besides, there are pins to output signals from the debugging features block 4 to the debugging tool 5 including a TRCLK pin (a trace clock pin for outputting trace clock signals from the debugging features block 4 to a debugger 7, a TRSYNC pin (a trace synchronization pin for outputting a signal that indicates a leading location of a packet constituting trace information), and a TRDATA pin (a trace outputting pin for outputting the trace information). A host computer 6 (trace information reconstructing means and debug controlling means) for controlling the debugging tool 5 can make various settings for debugging and send setting information to the debugging tool 5. The debugger 7 (the trace information reconstructing means and the debug controlling means) equates to a configuration consisting of the host computer 6 and the debugging tool 5.

Figure 2:
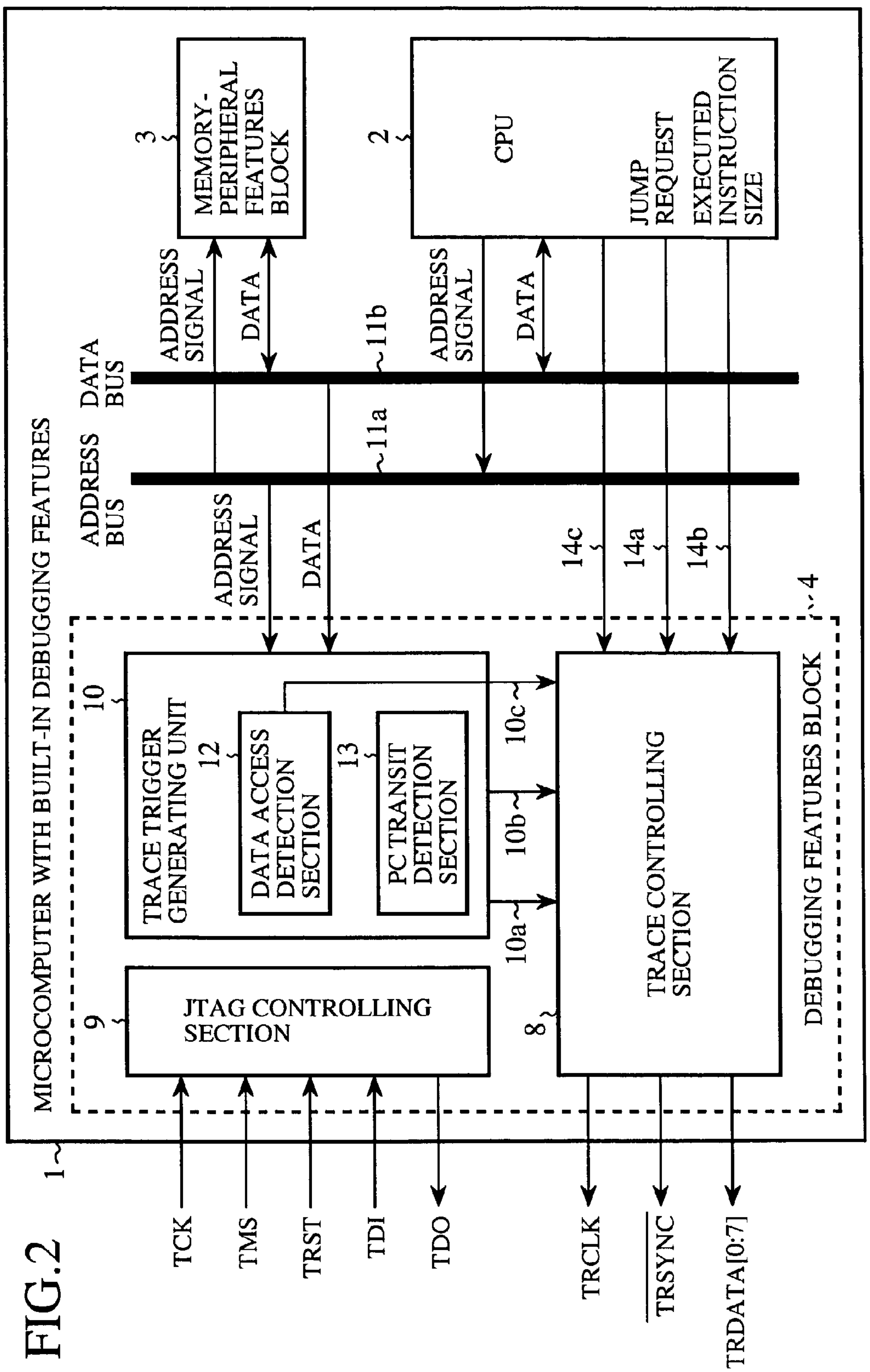
FIG. 2 is a block diagram showing a configuration of a microcomputer with built-in debugging features in FIG. 1.

FIG. 2 is a block diagram showing a configuration of the microcomputer with built-in debugging features in FIG. 1. In this figure, a trace controlling section 8 (collecting means, decimating means and outputting means) generates trace information that traces an internal state of the microcomputer 1 and outputs it to the debugging tool 5, and a JTAG controlling section 9 (outputting means) that controls the debugging features by communicating with the debugging tool 5 via the JTAG interface is comprised of control registers that is related to debugging and accessible via the JTAG interface, a TAP (Test Access Port) controller that controls access via the JTAG interface, and the like. A trace trigger generating unit 10 (collecting means) generates a trace start signal 10*a*, a trace end signal 10*b* and data access detection signal 10*c* that control trace operation of the trace controlling section 8.

The trace start signal 10*a* instructs the trace controlling section 8 to start outputting trace information, the trace end signal 10*b* instructs the trace controlling section 8 to finish outputting the trace information, and the data access detection signal 10*c* specifies the address that the CPU 2 has accessed and the data read therefrom or written thereto. An address bus 11*a* transfers address signals in the microcomputer 1, and a data bus 11*b* transfers data in the microcomputer 1. Data access detection section 12 constitutes the trace trigger generating unit 10 and detects the address and data accessed by the CPU 2 to generate the data access detection signal 10*c*. A PC transit detection section 13 constitutes the trace trigger generating unit and detects address information of the instruction executed by the CPU 2. A jump requesting signal 14*a* is output from the CPU 2 to the trace controlling section 8 to specify a branch-target address according to a branch instruction executed by the CPU 2. An executed instruction size signal 14*b* is output from the CPU 2 to the trace controlling section 8 to specify size of an instruction executed from the previous branch. Here, it is to be noted that elements similar to those in FIG. 1 are given like reference numerals and description of these elements is omitted.

Figure 3:
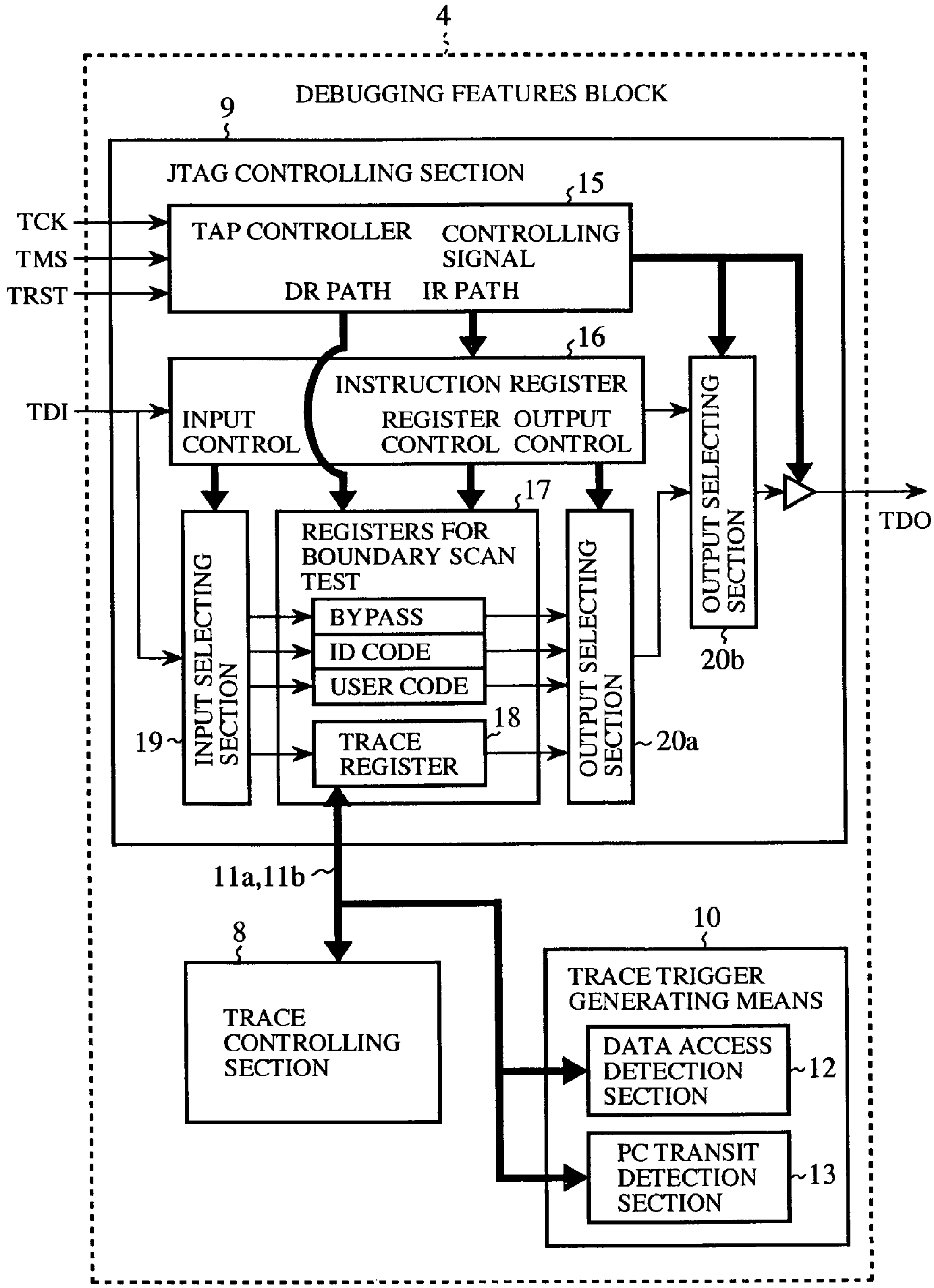
FIG. 3 is a block diagram showing a configuration of a debugging features block in FIG. 2.

FIG. 3 is a block diagram showing a configuration of the debugging features block in FIG. 2. In this figure, a TAP controller 15 controls access via the JTAG interface pins, and performs state transition according to input from the TCK pin and the TMS pin to control the debugger 7. An instruction register 16 holds test instruction code, and decodes the value of the test instruction code to generate a controlling signal for the debugger 7. Registers for a boundary scan test 17 are a series of serially connected shift registers located between the internal circuit of the microcomputer 1 and each pin, and, in the example shown, consist of registers that store a BYPASS instruction code, ID code (IDCODE) that comprises several JTAG private instructions to control the debugging features block 4, and a user, code (USERCODE). A trace register 18 stores address information that acts as a trigger to define a start or an end of trace. An input selecting section 19 selects a plurality of the registers storing the instruction code in the registers for the boundary scan test 17 and the trace register 18 as a target to receive instructions and data that have been input serially from the TDI pin. Output selecting sections 20*a*, 20*b* select the test instruction code or the test data that is output from the instruction register 16 and the registers for boundary scan test 17 and output it from the TDO pin. Here, it is to be noted that elements similar to those in FIG. 1 and FIG. 2 are given like reference numerals and description of these elements is omitted.

Figure 4:
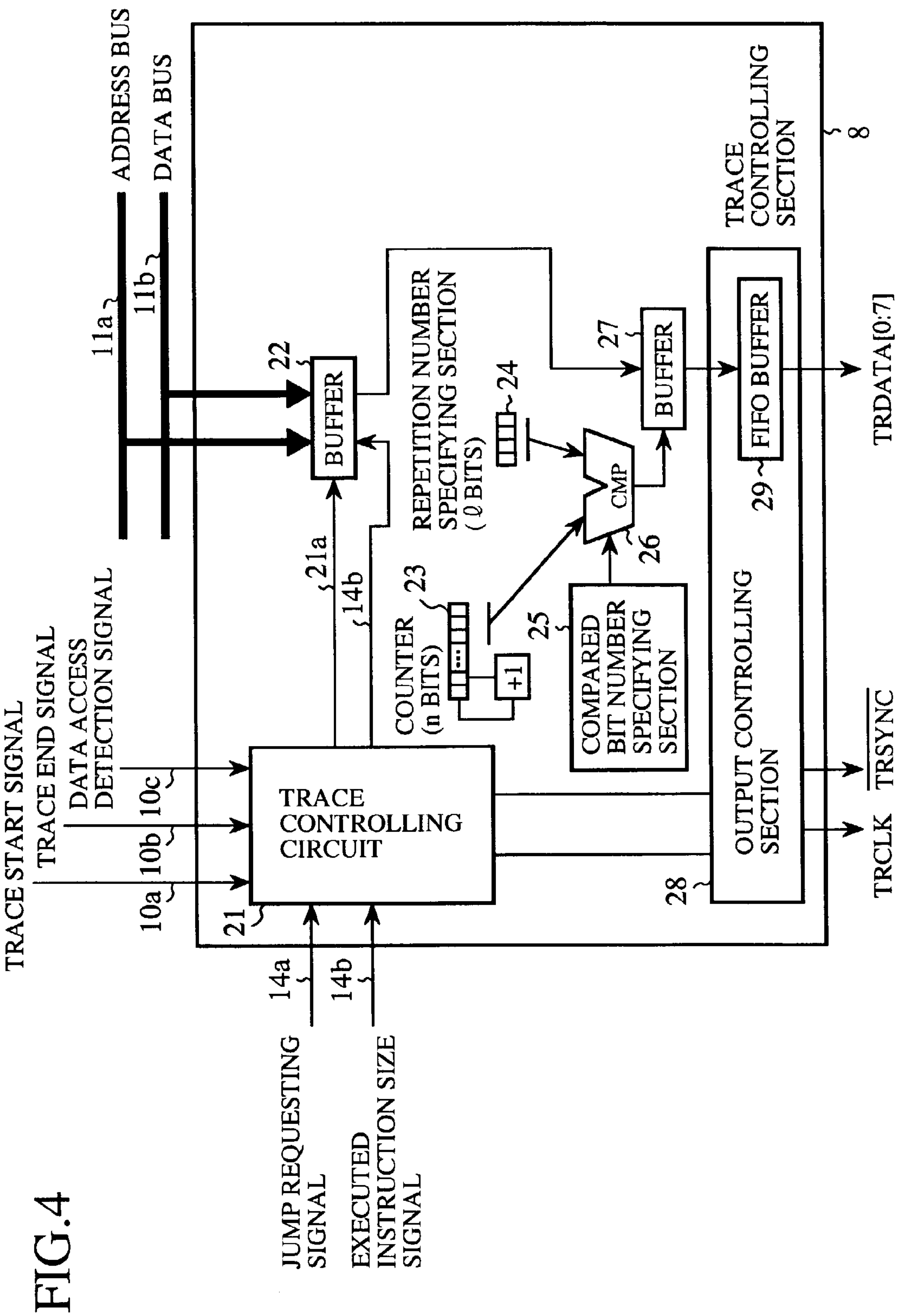
FIG. 4 is a block diagram showing a configuration of a trace controlling section in FIG. 3.

FIG. 4 is a block diagram showing a configuration of the trace controlling section in FIG. 3. In this figure, a trace controlling circuit 21 (the collecting means) receives trace-related information from outside to control trace operation. A latch signal 21*a* is generated by the trace controlling circuit 21 to latch addresses and data of the address bus 11*a* and the data bus 11*b* into a buffer 22. The buffer 22 (the collecting means) forms and stores the trace information, and latches the address information and the data information from the address bus 11*a* and the data bus 11*b* according to a latch signal 21*a* from the trace controlling circuit 21. A trace information counter 23 (the counting means, the decimating means and the total number keeping means) counts occurrence of the trace information and, in the example shown, consists of an n-bits counter that increments every time the trace information is created in the buffer 22. Repetition number specifying section 24 (the decimating means) that consists of a l-bit (n>l) counter specifies the number of repetitions of operations to acquire the trace information.

Compared bit number specifying section 25 (the decimating means) specifies the bit number of the counters that are compared by a comparator 26, which, more specifically, specifies the least significant order bit number of both counters to be compared when the counter value of the trace information counter 23 and the repetition number specifying section 24 are compared by the comparator 26. In the example shown, the least significant 2 bits of the trace information counter 23 and the repetition number specifying section 24 are specified to be compared. The comparator 26 (the decimating means) compares the counter values of the trace information counter 23 and the repetition number specifying section 24 and outputs the comparison result to the buffer 27. The buffer 27 (the collecting means), to which the trace information created in the buffer 22 is copied, stores the trace information temporarily before outputting it via the TRDATA pin. An output controlling section 28 (the outputting means) controls output from the trace controlling section 8, and outputs the trace clock signal TRCLK and the trace synchronization signal TRSYNC as well as the trace output TRDATA to the debugging tool 5. A FIFO buffer 29 (the outputting means) constitutes the output controlling section 28 and outputs the trace information from the buffer 27 to the debugging tool 5 by the predetermined bit number. Here, it is to be noted that elements similar to those in FIG. 1 to FIG. 3 are given like reference numerals and description of these elements is omitted.

Figure 5:
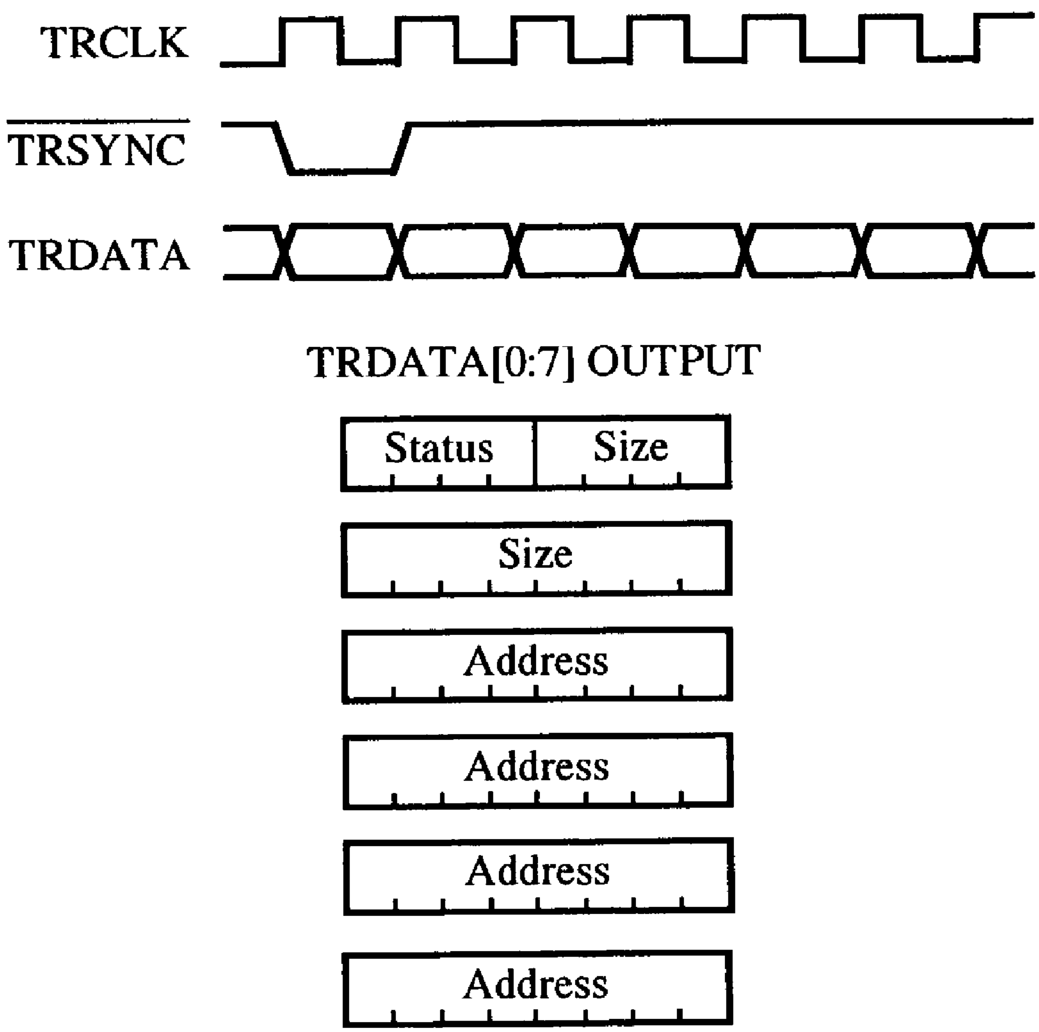
FIG. 5 is a diagram showing output timing and a format of branch trace information by the trace controlling section in FIG. 2.

FIG. 5 is a drawing showing output timing and a format of branch trace information by the trace controlling section in FIG. 2. The branch trace information is output by 8 bits from the TRDATA [0:7] pin in synchronization with the trace clock signal (TRCLK). To indicate it, in FIG. 5, 8 successive rectangles (wherein one rectangle corresponds to one bit) are represented as one unit. On the other hand, the TRSYNC signal is a signal showing a leading location of a packet that constitutes the trace information. As for the format of the branch trace information, an area designated as “Status” is a bit string for determining whether the given packet is the branch trace information or the data trace information, and consists of bits indicating whether overflow of the trace information has occurred or not, and bits specifying a branch type of the program. On the other hand, in an area designated as “Size”, size information of the instruction executed from the previous branch is stored. In an area designated as “Address”, a branch-target address is stored.

FIG. 6 is a diagram showing output timing and a format of data trace information by the trace controlling section in FIG. 2. The data trace information is also output by 8 bits from the TRDATA [0:7] pin in synchronization with the trace clock signal (TRCLK). To indicate it, also in FIG. 6, 8 successive rectangles (wherein one rectangle corresponds to one bit) are represented as one unit. As for the format of the data trace information, an area designated as “Status” is a bit string for determining whether the given packet is the brand trace information or the data trace information, and consists of bits indicating whether overflow of the trace information has occurred or not, and bits specifying whether the data access is read or write. In an area designated as “Address”, an address that has been accessed by the CPU 2 is stored. In an area designated as “Data”, the accessed data is stored. Further, an area designated as “Reserved” is a reserved bit string.

Next, an operation of the first embodiment will be described.

First, as shown in FIG. 1, the microcomputer 1 is connected to the debugging tool 5 via the pins dedicated for debugging and compliant with JTAG. This allows the user, as shown in FIG. 2, to read information that has been set in the data access detection section 12 and the PC transit detection section 13 via the internal buses 11*a*, 11*b*. More specifically, by using the debugger 7 to connect to the internal buses 11*a*, 11*b*, the user can learn as needed with which address the data configured to be detected by the data access detection section 12 is exchanged, and in which address the execution of the instruction configured to be detected by the PC passage detection means 13 is stored. Similarly, the debugger 7 can be used to access the trace information counter 23, the repetition number specifying section 24, and the compared bit number specifying section 25 as needed.

Next, the user downloads the program to be evaluated from the microcomputer 1 by using the debugger 7. It allows the user to determine trace conditions for the above program to be evaluated, and configure the trace-related information according to the above conditions by using the debugger 7. The trace-related information includes, for example, the address information in the memory space of the microcomputer 1 that triggers to start or end acquisition of the trace information when the CPU 2 executes the program to be evaluated. Further, as an initial state of the trace, the trace information counter 23 is initialized to “0” by using the debugger 7.

On the other hand, the compared bit number “2” is specified in the compared bit number specifying section 25 (that is, the least significant 2 bits of the trace information counter 23 and the repetition number specifying section 24 are specified to be compared), and the least significant 2 bits of the counter constituting the repetition number specifying section 24 are set to “0” by setting the value B'00. These settings are sent to the debugging tool 5 by the host computer 6. The debugging tool 5 inputs the above information serially to the JTAG controlling section 9 via the pins dedicated for debugging and compliant with JTAG. For example, the output-target of the trace-related information that has been input via the TDI pin is selected by the input selecting section 19 in the JTAG controlling section 9. It allows the above trace-related information to be set in the trace register 18 that is one of the cells of the JTAG controlling section 9. Other information is set to corresponding section via the internal buses.

The above information set in the trace register 18 is further set to the trace trigger generating unit 10 via the internal buses such as the address bus 11*a* and the data bus 11*b*. Through such setting, the condition to generate the trace start signal 10*a* and the trace end signal 10*b* in the trace trigger generating unit 10 according to the above trace-related information may be specified. Here, as an example, assume that the trace trigger generating unit 10 generates the trace start signal 10*a* when the CPU 2 that executes the program to be evaluated writes data to the address of 100, and the trace trigger generating unit 10 generates the trace end signal 10*b* when the instruction of the program to be evaluated stored in the address of 400 is executed.

In the condition in which the counter constituting the repetition number specifying section 24 is set to B'00 as described above, a trace operation for the first time is started. More specifically, the CPU 2 starts execution of the program to be evaluated in response to the instruction from the debugger 7 by the user. At this time, when the data is written to the address of 100, the trace controlling section 8 asserts the trace start signal 10*a* from the trace trigger generating unit 10 to start the trace operation.

Figure 7:
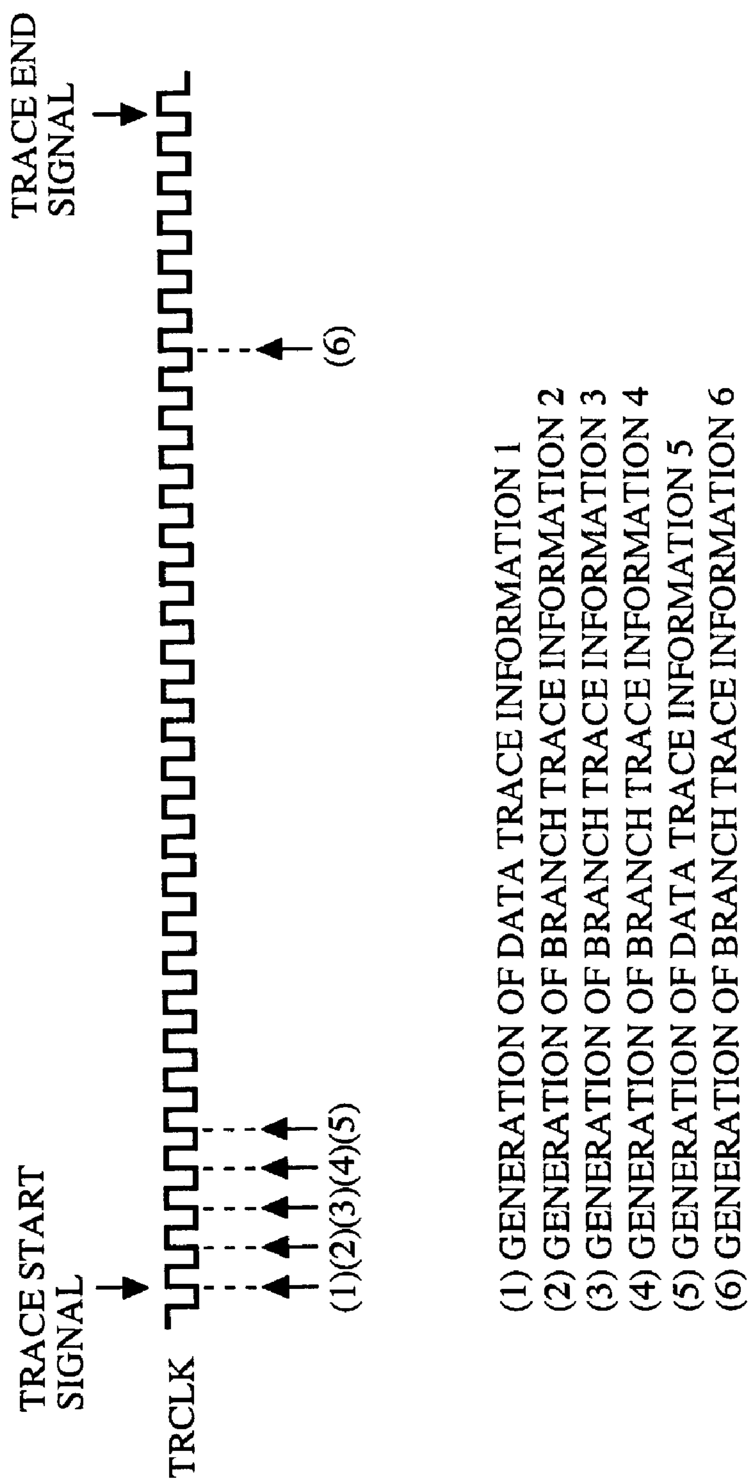
FIG. 7 is a diagram showing an example of generating timing of the trace information in the debugging system according to the first embodiment.

FIG. 7 is a diagram showing an example of generating timing of the trace information in the debugging system in the first embodiment. The acquiring operation of the trace information will be described with reference to FIG. 7. First, at 0-th clock of the trace clock signal (TRCLK) (the timing shown as (1) in FIG. 7), when the trace controlling circuit 21 receives the trace start signal 10*a*, it generates the latch signal 21*a* and outputs it to the buffer 22. The address information and the data information from the address bus 11*a* and data bus 11*b* are respectively latched in the buffer 22 which has received the latch signal 21*a* to create the data trace information 1.

Next, when the trace clock signal (TRCLK) proceeds to the first clock (the timing shown as (2) in FIG. 7), the data trace information 1 is copied from the buffer 22 to the buffer 27. At the same time, the value "0" is set to the trace information counter 23. Then, since the value "2" has been set to the compared bit number specifying section 25, the comparator 26 compares the least significant 2 bits (B'00) of the trace information counter 23 with the least significant 2 bits (B'00) of the repetition number specifying section 24 and outputs the signal indicating the comparison result to the buffer 27. At this time, since the values of both counters are same, the data trace information 1 copied in the buffer 27 is not deleted.

Also, at the first clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. It allows the branch-target address to be stored in the buffer 22 via the address bus 11*a*. At this time, the trace controlling circuit 21 outputs the executed instruction size signal 14*b* to the buffer 22.

The trace controlling circuit 21 acquires the size of the instruction executed from the previous branch from the executed instruction size signal 14*b* and sets it in the buffer 22. It allows the branch-target address to be stored in the buffer 22 from the address bus 11*a* sequentially and the branch trace information 2 that traces each branch address in the evaluated program that is executed by the CPU 2 is created.

Next, when the trace clock signal (TRCLK) proceeds to the second clock, the data trace information 1 is copied from the buffer 27 to the FIFO buffer 29 by the trace controlling circuit 21, and the branch trace information 2 is copied from the buffer 22 to the buffer 27. Further, when the trace information 2 is created in the buffer 22, the trace controlling circuit 21 increments the trace information counter 23 to change the counter value from "0" (B'00) to "1" (B'01).

Then, the comparator 26 compares the least significant 2 bits (B'01) of the trace information counter 23 with the least significant 2 bits (B'00) of the repetition number specifying section 24 and outputs the signal indicating the comparison result to the buffer 27. At this time, since the values of the both counters are not same, the trace controlling circuit 21 deletes the branch trace information 2 that is copied in the buffer 27.

Also, at the second clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. Just as described above, it allows the branch-target address to be stored in the buffer 22 from the address bus 11*a* sequentially and the branch trace information 3 is created to trace each branch address in the evaluated program executed by the CPU 2.

Next, when the trace clock signal (TRCLK) proceeds to the third clock, the branch trace information 2 is copied from the buffer 22 to the buffer 27 by the CPU 2. When the trace information is created in the buffer 22, the CPU 2 increments the trace information counter 23 by 1 to change the counter value from "1" (B'01) to "2" (B'10).

Just as described above, the comparator 26 compares the least significant 2 bits (B'10) of the trace information counter 23 with the least significant 2 bits (B'00) of the repetition number specifying section 24 and outputs the signal indicating the comparison result to the buffer 27. At this time, since the values of the both counters are not same, the CPU 2 deletes the branch trace information 3 that is copied in the buffer 27.

Also, at the third clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. Also as described above, it allows the branch-target address to be stored in the buffer 22 from the address bus 11*a* sequentially and the branch trace information 4 is created to trace each branch address in the evaluated program executed by the CPU 2.

Subsequently, the output controlling section 28 outputs the leading 8 bits of the data trace information 1 stored in the FIFO buffer 29 from the TRDATA [0:7] pin to the debugger 7.

Similarly, as the trace clock signal (TRCLK) further proceeds, the trace information counter 23 increments by 1 each time the trace information is created in the-buffer 22. By doing this, following the branch trace information 2 and the branch trace information 3, the branch trace information 4 created in the third clock as well as the branch trace information 6 that is created by the branch instruction at the 3-rd clock shown in FIG. 7 is deleted in the buffer 27.

As a result of the trace for the first time, the data trace information 1 and the data trace information 5 is output from the debugging features block 4. At this time, the number of the buffer columns is sufficient, in other words, the trace information is deleted as appropriate to make free columns in the buffer 27 by comparison in the comparator 26, therefore a phenomenon called the overflow of the trace information wherein there is no free column in the buffer where the trace information is stored should not occur.

FIG. 8 is a diagram showing output timing of the trace information in the trace for the first time. As shown in the figure, each of the data trace information 1 and the data trace information 5 is output by 8 bits in synchronization with the trace clock signal (TRCLK) from the TRDATA [0:7] pin to the debugger 7. Here, since the trace information comprised of 72 bits is shown in this example, so it takes 9 clocks to output it.

Then, when the CPU 2 executes the instruction of the program to be evaluated that is stored in the address of 400, the trace trigger generating unit 10 generates the trace end signal 10*b* and outputs it to the trace controlling section 8. It makes the trace controlling section 8 to finish the trace for the first time.

Next, the trace for the second time will be performed. More specifically, the user sets "1" (B'01) in the least significant 2 bits of the counter of the repetition number specifying section 24 by using the debugger 7 to instruct the CPU 2 to execute the program to be evaluated from the start address (of 100).

It allows the trace information-counter 23 to increment, the comparator 26 to compare the trace information counter 23 with the repetition number specifying section 24, and the content of the buffer 27 to be deleted as described above, as a result of which the branch trace information 2 and the branch trace information 6 is acquired.

In the trace for the third time, the user uses debugger 7 to set "2" (B'10) in the least significant 2 bits of the counter of the repetition number specifying section 24 to instruct the CPU 2 to execute the program to be evaluated from the start address (of 100).

It allows the trace information counter 23 to increment, the comparator to compare the trace information counter 23 with the repetition number specifying section 24, and the content of the buffer 27 to be deleted as described above, as a result of which the branch trace information 3 is acquired.

Further, in the trace for the fourth time, the user uses debugger 7 to set "3" (B'11) in the least significant 2 bits of the counter of the repetition number specifying section 24 to instruct the CPU 2 to execute the program to be evaluated from the start address (of 100).

It allows the trace information counter 23 to increment, the comparator 26 to compare the trace information counter 23 with the repetition number specifying section 24, and the content of the buffer 27 to be deleted as described above, as a result of which the branch trace information 4 is acquired.

FIG. 9 is a diagram showing relationship between the number of traces and the trace information. As shown in the figure, in the debugging system according to the first embodiment, real-time trace information is acquired in a split manner. Such acquisition in a split manner is effective when the subsequent branch occurs within 9 clocks after acquisition of the just previous branch trace information, for example, assuming that one of the trace information is comprised of 72 bits and the trace information is output from the TRDATA pin by 8 bits. In such a case, the conventional debugging system cannot output both branch-target addresses of the just previous branch and the next branch, but the debugging system according to the first embodiment can acquire the branch trace information about the just previous branch and the branch trace information about the next branch separately. It significantly reduces the possibility that the overflow of the content of the trace information occurs.

As described above, a plurality of the trace information acquired at four times in a split manner is input to the debugger 7. In the debugger 7, the trace information that essentially should be acquired in a real-time trace is reconstructed from the above plurality of the trace information by the host computer 6.

FIG. 10 is a diagram describing reconstruction of the trace information that should be acquired in a real-time trace. In this figure, the data trace information 1 that is the first information acquired in the trace for the first time is shown as the first information in the trace number 1, the branch trace information 2 acquired in the trace for the second time is shown as the first information in the trace number 2, the branch trace information 3 acquired in the trace for the third time is shown as the first information in the trace number 3, and the branch trace information 4 acquired in the trace for the fourth time is shown as the first information in the trace number 4.

Further, the data trace information 5 acquired in the trace for the first time is shown as the second information in the trace number 1, and the branch trace information 6 acquired in the trace for the second time is shown as the second information in the trace number 2, but only one of the trace information is acquired,and therefore there is not the second information in the trace for the third time, and only one of the trace information is acquired and therefore there is not the second information in the trace for the fourth time. In such a manner, by rearranging the trace information acquired in a split manner by using the host computer 6, a series of information in an order of the data trace information 1, the branch trace information 1, the branch trace information 2, the branch trace information 3, the branch trace information 4, the data trace information 5, and the data trace information is configured. In other words, the trace information from the trace start to the trace end is reconfigured.

In the above operation, when the buffer overflows with the trace information (when new trace information is intended to be stored in the buffer 22 but there is no space in the buffer 22), overflow bits that indicates occurrence of the overflow of the trace information may be alternatively set in the "Status" part of the trace information already stored in the buffer 22 so that the trace information that should be essentially taken in the buffer 22 if there was space in it might be discarded. At this time, by setting up the feature in the debugger 7 to detect the overflow bits in the "Status" part of the trace information, the user can determine occurrence of the overflow (in other words, the fact that there is trace information which is to be output after the acquired trace information but was not output) via the debugger 7.

More specifically, it will be described as follows. For example, assume that overflow of the branch trace information 4 and the branch trace information 5 in the series of the trace information shown in FIG. 7 will occur and the branch trace information 4 will be discarded if the trace information is acquired not in a split manner at plural times but once. At this time, the trace information eventually output to the debugger 7 includes the data trace information 1, the branch trace information 2, the branch trace information 3, and the branch trace information 6. In this case, by configuring the overflow bits in the "Status" part of the branch trace information 3, the user can determine through the debugger 7 that there is trace information which is to be output after the branch trace information 3 but was not output.

Further, though an example has been described wherein the buffer to store the trace information consists of three steps of the buffer 22, the buffer 27 and FIFO buffer 29 and the buffer does not overflow when the trace information is acquired at four times, if the buffer overflows even though the trace information is acquired four times in a split manner, then a configuration of the compared bit number specifying section 25 may be changed to increase the number of acquisition of the trace information. For example, the value "3" may be specified in the compared bit number specifying section 25 (that is, the least significant 3 bits of the counters 23 and 24 may be compared and the trace information counter 23 may increment eight times till the least significant 3 bits returns to "0") so that the trace information may be acquired eight times in a split manner. In such a manner, the overflow of the buffer (a loss of the trace information) may be avoided by increasing the number of acquisition of the trace information.

As a further application, a feature may be alternatively added to the debugger 7 to automatically change the configuration of the compared bit number specifying section 25 when, as described above, the debugger 7 detects occurrence of over flow of the trace information even in case of split acquisition so that the number of split acquisition of the trace information may be increased automatically and the trace operation may be performed again.

Further, when the trace information is acquired in a split manner, the user may reproduce a phenomenon in the debugging operation via the debugger 7 every time while acquiring the trace information. At this time, if the phenomenon in the debugging operation is reproduced properly when the trace information is acquired for several times, debugger 7 may be configured to automatically acquire the trace information in a split manner plural times.

As described above, according to the first embodiment, the overflow of the trace information may be avoided by decimating the trace information at predetermined intervals and acquiring the trace information plural times.

Besides, in generally speaking, it is impossible to predict how much trace information will be generated unless the program to be evaluated is executed by the CPU 2. To solve this problem, by acquiring the trace information in a split manner as in the above first embodiment, the configuration of the compared bit number specifying section 25 may be changed appropriately to alter the number of acquisition, based upon the presence of the overflow of the trace information. It may eliminate the overflow of the trace information without need to predict the degree of occurrence of the overflow of the trace information.

Further, since it is possible to reconstruct given trace information from a plurality of trace information acquired by the debugger 7 regardless of the number of acquisition of the trace information, the trace information within a program execution interval specified by the debugger 7 may be acquired without overflow and without need to add the number of trace information output pins (TRDATA) of the microcomputer with built-in debugging features 1 or increase operating frequency of the trace clock signal (TRCLK) to speed up.

Still further, though there is shown an example wherein the trace information counter 23 increment by one every time the trace information is created in the buffer 22 in the above first embodiment, a similar effect may be obtained by configuring the trace information counter 23 to increment by one in synchronization with the trace clock frequency.

(Second Embodiment)

Figure 11:
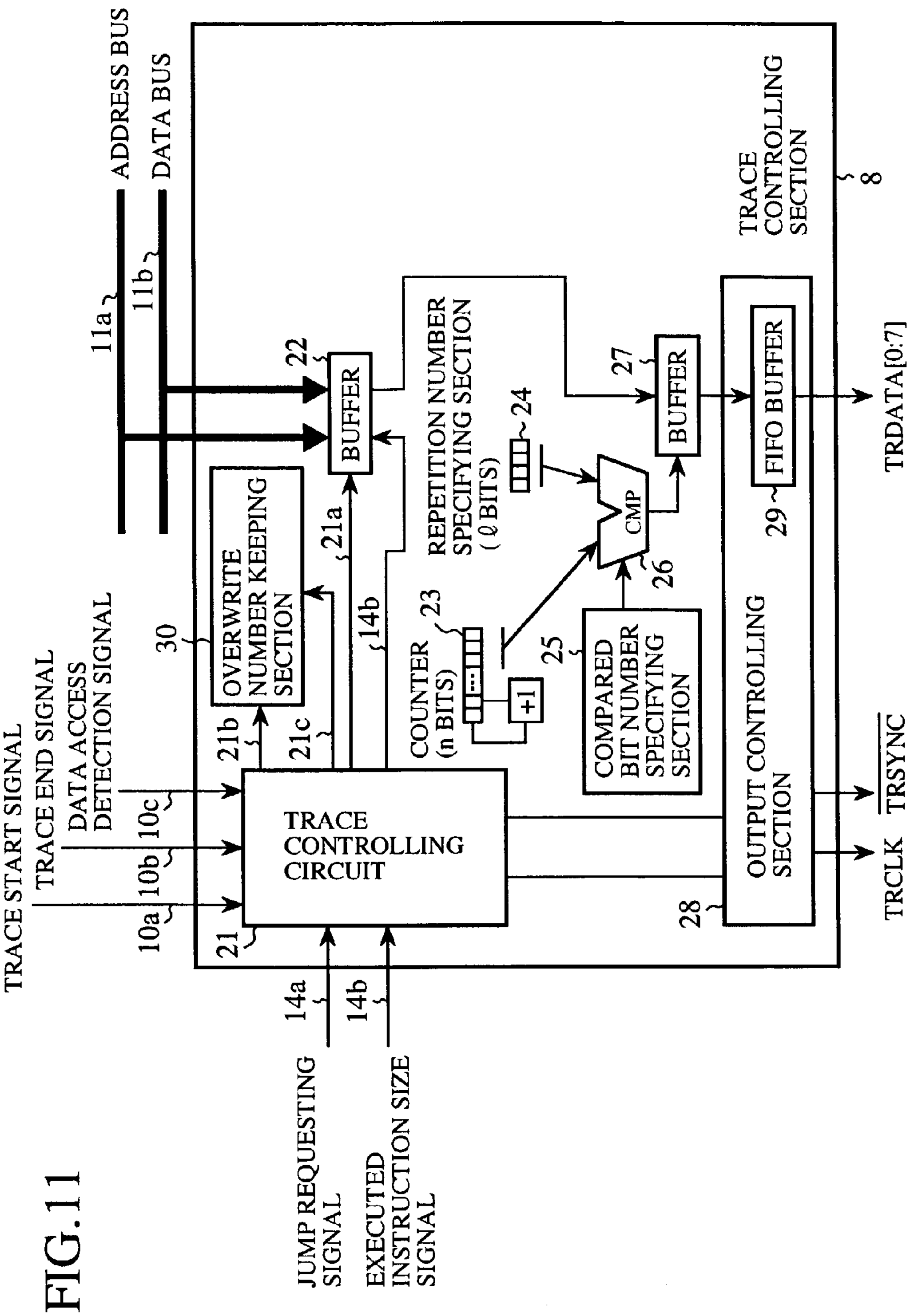
FIG. 11 is a block diagram showing a trace controlling section of a debugging system according to a second embodiment of the present invention.

FIG. 11 is a block diagram showing a trace controlling section of a debugging system according to a second embodiment of the present invention. In this figure, a reset signal 21*b* is output from the trace controlling circuit 21 to an overwrite number keeping section 30 to reset the content kept in the overwrite number keeping section 30. An overwrite number setting signal 21*c* is output from the trace controlling circuit 21 to the overwrite number keeping section 30 to indicate the number of the discarded trace information. The overwrite number keeping section 30 (the discard number keeping means) is comprised of a counter that keeps the maximum number of the trace information that is discarded continuously from start to end of acquisition of the trace information. Here, it is to be noted that elements similar to those in FIG. 4 are given like reference numerals and description of these elements is omitted.

Next, the operation will be described.

First, as shown in FIG. 1, the microcomputer 1 is connected to the debugging tool 5 via the pins dedicated for debugging and compliant with JTAG. Just as in the above first embodiment, this allows the user to read information that has been set in the data access detection section 12 and the PC transit detection section 13 via the internal buses 11*a*, 11*b*. Similarly, the debugger 7 can be used to access the trace information counter 23, the repetition number specifying section 24, the compared bit number specifying section 25, and the overwrite number keeping section 30 as occasion demands.

Next, the user downloads the program to be evaluated from the microcomputer 1 by using the debugger 7. It allows the user to determine trace conditions for the above program to be evaluated, and configure the trace-related information according to the above conditions by using the debugger 7. The trace-related information includes, for example, the address information in the memory space of the microcomputer 1 that triggers to start or end acquisition of the trace information when the CPU 2 executes the program to be evaluated.

Further, as initial state of the trace, the overwrite number keeping section 30 is initialized to "0" and "0" is specified in the compared bit number specifying section 25 (that is, comparison between the trace information counter 23 and the repetition number specifying section 24 is not made). Just as in the above first embodiment, such information is set in each element within the debugging features block 4 via the host computer 6 and the debugging tool 5. For example, the overwrite number keeping section 30 is initialized in response to the reset signal 21*b* from the trace controlling circuit 21.

Hereinafter, for the sake of simplicity, a case in which the trace information is generated in the timing shown in FIG. 7 will be described.

Then, the CPU 2 starts execution of the program to be evaluated and then starts the trace for the first time in response to the user's instruction from the debugger 7. At this time, when data is written in the address specified in the above trace-related information, the trace controlling section 8 asserts the trace start signal 10*a* from the trace trigger generating unit 10 to start the trace operation.

At 0-th clock of the trace clock signal (TRCLK) (the timing shown as (1) in FIG. 7), when the trace controlling circuit 21 receives the trace start signal 10*a*, it generates the latch signal 21*a* and outputs it to the buffer 22. The address information and the data information from the address buss 11*a* and the data bus 11*b* are respectively latched in the buffer 22 which has received the latch signal 21*a* to create the data trace information 1.

Next, when the trace clock signal (TRCLK) proceeds to the first clock (the timing shown as (2) in FIG. 7), the data trace information 1 is copied from the buffer 22 to the buffer 27. At the same time, the value "0" is set to the trace information-counter 23. Then, since the value "0" has been set to the compared bit number specifying section 25, the comparator 26 does not make comparing operation.

Also, at the first clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. It allows the branch-target address to be stored in the buffer 22 via the address bus 11*a*. At this time, the trace controlling circuit 21 outputs the executed instruction size signal 14*b* to the buffer 22.

The trace controlling circuit 21 acquires the size of the instruction executed from the previous branch from the executed instruction size signal 14*b* and sets it in the buffer 22. It allows the branch-target address to be stored in the buffer 22 from the address bus 11*a* and the branch trace information 2 that traces each branch address in the evaluated program that is executed by the CPU 2 is created.

Next, when the trace clock signal (TRCLK) proceeds to the second clock, the data trace information 1 is copied from the buffer 27 to the FIFO buffer 29, and the branch trace information 2 is copied from the buffer 22 to the buffer 27. Further, when the trace information 2 is created in the buffer 22, the CPU 2 increments the trace information counter 23 to change the counter value from “0” (B'00) to “1” (B'01). At this time, since the comparator 26 does not make comparison, the content of the buffer 27 is not deleted.

Subsequently, also at the second clock of the trace clock signal (TRCLK), the CPU 2 executes the branch instruction of the program to be evaluated. At this time, the CPU 2 generates the jump requesting signal 14*a* that specifies the branch-target address and the executed instruction signal 14*b* that specifies the size of the instruction executed from the previous branch and outputs them to the trace controlling circuit 21. Just as described above, it allows the branch-target address to be stored in the buffer 22 from the address bus 11*a* sequentially and the branch trace information 3 is created to trace each branch address in the evaluated program executed by the CPU 2.

Next, also at the third clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. Just as described above, it allows the branch-target address to be stored in the buffer 22 from the address bus 11*a* sequentially and the operation proceeds to the next process to create the branch trace information 4 that traces each branch address in the evaluated program that is executed by the CPU 2.

However, since there is already the branch trace information 3 in Buffer 22, the trace controlling circuit 21 sets the overflow bits to indicate occurrence of the overflow of the trace information in the “Status” part of the branch trace information 3, and discards the branch trace information 4. At this time, the trace controlling circuit 21 records that the trace information has been discarded once in an internal storage section (such as a counter, memory and the like, not shown).

Subsequently, also at the fourth clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. Just as described above, it allows the branch-target address to be stored in the buffer 22 from the address bus 11*a* sequentially and the operation proceeds to the next process to create the branch trace information 5 that traces each branch address in the evaluated program that is executed by the CPU 2.

Here, as shown in FIG. 8, since it takes 9 clocks to output the data trace information and the FIFO buffer 29 starts to output at the third clock, it is at the 11-th clock that the data trace information 1 is output completely from the TRDATA pin. Therefore, at the time of transition to the process to create the above branch trace information 5, the data trace information 1 still remains in the FIFO buffer 29. As a result, the trace controlling circuit 21 discards the branch trace information 5, and, records that the trace information has been discarded twice, just as described above.

After that, at the 23-rd clock of the trace clock signal (TRCLK), as shown in FIG. 7, the CPU 2 executes the branch instruction of the program to be evaluated. At this time, the CPU 2 generates the jump requesting signal 14*a* that specifies the branch-target address and the executed instruction size signal 14*b* that specifies the size of the instruction executed from the previous branch and outputs them to the trace controlling circuit 21. When the trace controlling circuit 21 asserts the jump requesting signal 14*a*, it outputs the latch signal 21*a* to the buffer 22. At this time, since the buffer 22 is already empty, the branch-target address is taken in the buffer 22 from the address bus 11*a* sequentially, and the branch trace information 6 is created to trace each branch address in the evaluated program that is executed by the CPU 2.

Here, the trace controlling circuit 21 compares the number of the trace information that has been discarded up to this time (two in this example) with the value that has been set in the overwrite number keeping section 30 to set the larger value of these in the overwrite number keeping section 30. In this case, since the value “0” has been set as an initial state in the overwrite number keeping section 30, the value “2” that is the number of the trace information that has been discarded up to this time is newly set in the overwrite number keeping section 30. More specifically, the trace controlling circuit 21 outputs the number of the trace information that has been discarded up to this time to the overwrite number keeping section 30 as the overwrite number setting signal 21*c* to set the value there.

After that, when the CPU 2 executes the instruction stored in the address that acts as a trigger to end the trace, the trace trigger generating unit 10 generates the trace end signal 10*b* and outputs it to the trace controlling section 8. Also at this time, the trace controlling section 8 ends the trace, and then compares the number of the trace information that has been discarded up to this time with the value that has been set in the overwrite number keeping section 30 to set the larger value of these in the overwrite number keeping section 30. In the example shown in FIG. 7, since no trace information is discarded after the 23-rd clock, the value set in the overwrite number keeping section 30 still remains “2”.

Through the operation described above, in the overwrite number keeping section 30, the largest number of the discarded trace information is set continuously from the start to end of acquisition of the trace information when the acquisition in a split manner is not performed.

It allows the user to read the largest number of the trace information that has been discarded continuously (the value set in the overwrite number keeping section 30) by using the debugger 7 to determine the appropriate number of split acquisition of the trace information. Here, as an alternative way to inform the debugger 7 of the number of the discarded trace information, a dedicated part may be configured to store the number of the discarded trace information in the branch trace information packet or the data trace information packet. In such a case, the user can know the largest value of the number of the discarded trace information by detecting the above part of the trace information packet using the debugger 7.

To properly acquire the trace information, for example, if the number of the discarded trace information is "1", it is sufficient to acquire the trace information twice. In this case, the value "1" may be set in the compared bit number specifying section 25 and the trace operation may be performed just as in the above first embodiment. By doing this, the trace information may be acquired without overflow.

Further, by using the debugger 7, the user may read the total number of the trace information that occurs during the trace information acquisition period from the trace information counter 23, each time the trace information occurs. Needless to say, the total number of the trace information may be utilized as important reference information to determine the appropriate number of the split acquisition of the trace information.

As described above, according to the second embodiment, since the overwrite number keeping section 30 is provided to store the largest number of the trace information that has been discarded continuously during the trace information acquisition period, the appropriate number of acquisition of the trace information can be determined using the above largest value read from the overwrite number keeping section 30. Consequently, a waste of trace time due to the more number of the acquisition of the trace information than necessary may be avoided and therefore an efficient debugging operation may be performed.

Further, since the total number of the trace information that has been occurred during the trace information acquisition period may be read from the trace information counter 23 as appropriate, the trace information may be acquired without overflow with the minimum number of acquisition with reference to such total number of the trace information.

(Third Embodiment)

Figure 12:
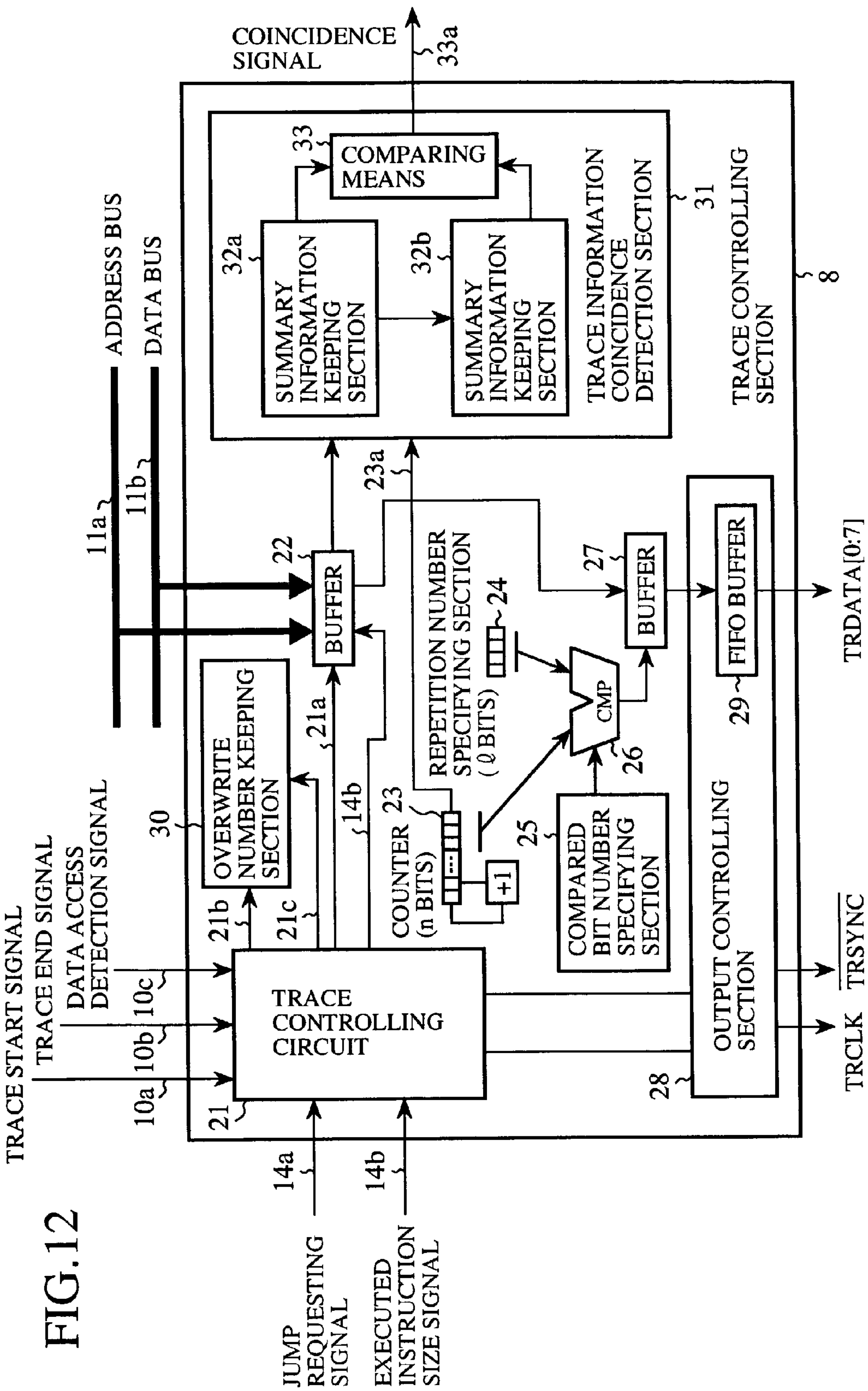
FIG. 12 is a block diagram showing a trace controlling section of a debugging system according to a third embodiment of the present invention.

FIG. 12 is a block diagram showing a trace controlling section of a debugging system according to a third embodiment of the present invention. In this figure, a counter value indicating signal 23_a_ is output from the trace information counter 23 to a trace information coincidence detection section 31 to notify the trace information coincidence detection section 31 of the number of occurrence of the trace information. The trace information coincidence detection section 31 is comprised of summary information keeping section 32_a_, 32_b_ and a comparing means 33 and detects whether a plurality of the trace information acquired in a split manner coincides or not. Each of the summary information keeping section (the summary keeping means) 32_a_, 32_b_ keeps summary information about the trace information acquired in a split manner plural times (that consists of a checksum calculated for all of the trace information, a checksum for the address information in the trace information, and the like). The comparing means 33 compares the summary information kept by the summary information keeping section 32_a_, 32_b_, respectively. A coincidence signal 33_a_ indicates a comparison result by the comparing means 33. Further, though an example is shown in which a configuration such as the trace information coincidence detection section 31 and the like according to the third embodiment is applied to the above second embodiment in FIG. 12, it may be also applied to the above first embodiment, as a matter of course. Here, it is to be noted that elements similar to those in FIG. 4 and FIG. 11 are given like reference numerals and description of these elements is omitted.

Next, an operation of the third embodiment will be described.

First, as shown in FIG. 1, the microcomputer 1 is connected to the debugging tool 5 via the pins dedicated for debugging and compliant with JTAG. This allows the user to read information that has been set in the data access detection section 12 and the PC transit detection section 13 via the internal buses 11_a_, 11_b_. Similarly, the debugger 7 can be used to access the trace information counter 23, the repetition number specifying section 24, the compared bit number specifying section 25, the overwrite number keeping section 30, and the summary information keeping section 32_a_, 32_b_ as needed.

Next, as an initial state, the trace information counter 23 and the summary information keeping section 32_a_, 32_b_ are initialized by using the debugger 7. Further, the value "2" is specified in the compared bit number specifying section 25 (that is, the least significant 2 bits of both the trace information counter 23 and the repetition number specifying section 24 are specified to be compared), and the least significant 2 bits of the counter constituting the repetition number specifying section 24 are set to "0" by setting the value B'00 (it allows the number of acquisition of the trace information to be set to "4" (four times)). Just as in the above first embodiment, such information may be set in each of the constituent elements in the debugging features block 4 via the host computer 6 and the debugging tool 5.

Next, the trace for the first time may be performed just as in the first embodiment. Then, as a result of the trace for the first time, the data trace information 1 and the data trace information 5 is output from the TRDATA pin. In the trace for the first time, every time the trace information is created in the buffer 22, the trace controlling circuit 21 copies the trace information to the trace information coincidence detection section 31. At the same time, every time the trace information is generated, a value of the trace information counter 23 is output to the trace information coincidence detection section 31 as the counter value indicating signal 23_a_. At this time, every time the trace information coincidence detection section 31 receives such information, it generates the summary information of the received trace information (the summary information about a series of the trace information ranging from the data trace information 1 to the branch trace information 6 generated in the trace for the first time) and stores the summary information in the summary information keeping section 32_a_. Here, the summary information may include, for example, the checksum calculated for all of the trace information and the checksum for the address information in the trace information that have been copied as described above, or the total number of the trace information copied as described above, and the like. After that, before performing the trace for the second time, the trace information coincidence detection section 31 copies the summary information in the summary information keeping section 32_a_ to the summary information keeping section 32_b_.

The trace for the second time is performed as in the first embodiment. The increment of the trace information counter 23, the comparison between the trace information counter 23 and the repetition number specifying section 24 by the comparator 26, and the deletion of the buffer 27 is performed as described above, and consequently, the branch trace information 2 and the branch trace information 6 is output from the TRDATA pin. Also in the trace for the second time, every time the trace information is created in the buffer 22, the trace controlling circuit 21 copies the trace information to the trace information coincidence detection section 31. At the same time, every time the trace information is generated, the value of the trace information counter 23 is output to the trace information coincidence detection section 31 as the counter value indicating signal 23*a*. It allows the trace information coincidence detection section 31 to generate the summary information for the trace for the second time and store it in the summary information keeping section 32*a*, just as in the trace for the first time.

Here, since a series of the trace information ranging from the data trace information 1 to the branch trace information 6 may be generated in the trace for both the first and second time, the trace information of both traces coincides. After that, the comparing means 33 compares summary information stored in each of the summary information keeping section 32*a*, 32*b*. As described above, since the trace information about the trace for the first time coincides with the one for the second time, the summary information in the summary information keeping section 32*a* also coincides with the one in the summary information keeping section 32*b*. The comparing means 33 outputs outwardly the coincidence signal 33*a* indicating the coincidence of the summary information.

At this time, noncoincidence of the summary information between the summary information keeping section 32*a* and 32*b* means that the trace information of the trace for the first time is different from the one for the second time. In other words, it means that CPU 2 has executed the program to be evaluated differently for the first and second time. If such information that provides different results in the trace for the first and second time is used to reconstruct the trace information for a real-time trace, the proper trace information that should be generated during the trace period may not be obtained. Therefore, in the third embodiment, the debugger 7 is provided with a feature to notify the user if the different trace information is generated during an acquisition period (such as by displaying the above notification on a displaying device of the host computer 6, and the like). Such notification allows the user to retry the trace in any manner. Alternatively, the debugger 7 may be configured to retry the trace automatically when the different trace information has been generated during the acquisition period.

As described above, according to the third embodiment, since the trace information coincidence detection section 31 is provided to detect whether each of the trace information acquired during each acquisition period is coincident or not based upon the summary information of the trace information, it is possible to ascertain whether same trace information is generated every time when the trace information is acquired. It obviates the need for installing a large amount of trace memory in the microcomputer 1 to compare all of the trace information generated during the acquisition period. It is also advantageous in terms of cost-effectiveness.

Further, since the trace information coincidence detection section 31 has the two summary information keeping section 32*a*, 32*b* that can distinguish between the trace information for the previous time and the one for this time, it is possible to ascertain whether the program runs stably and reproducibly by executing the program a plurality of times during the trace period. Such procedure may be also utilized as a debugging technique.

Still further, in the above third embodiment, though an example is shown wherein the trace information coincidence detection section 31 comprises the two summary information keeping section 32*a*, 32*b* and the comparing means 33, it may alternatively comprise only the summary information keeping section 32*a*. More specifically, the debugger 7 may read and store the content of the summary information keeping section 32*a* as well as perform comparing operation every time the trace information is acquired in a split manner.

(Fourth Embodiment)

Figure 13:
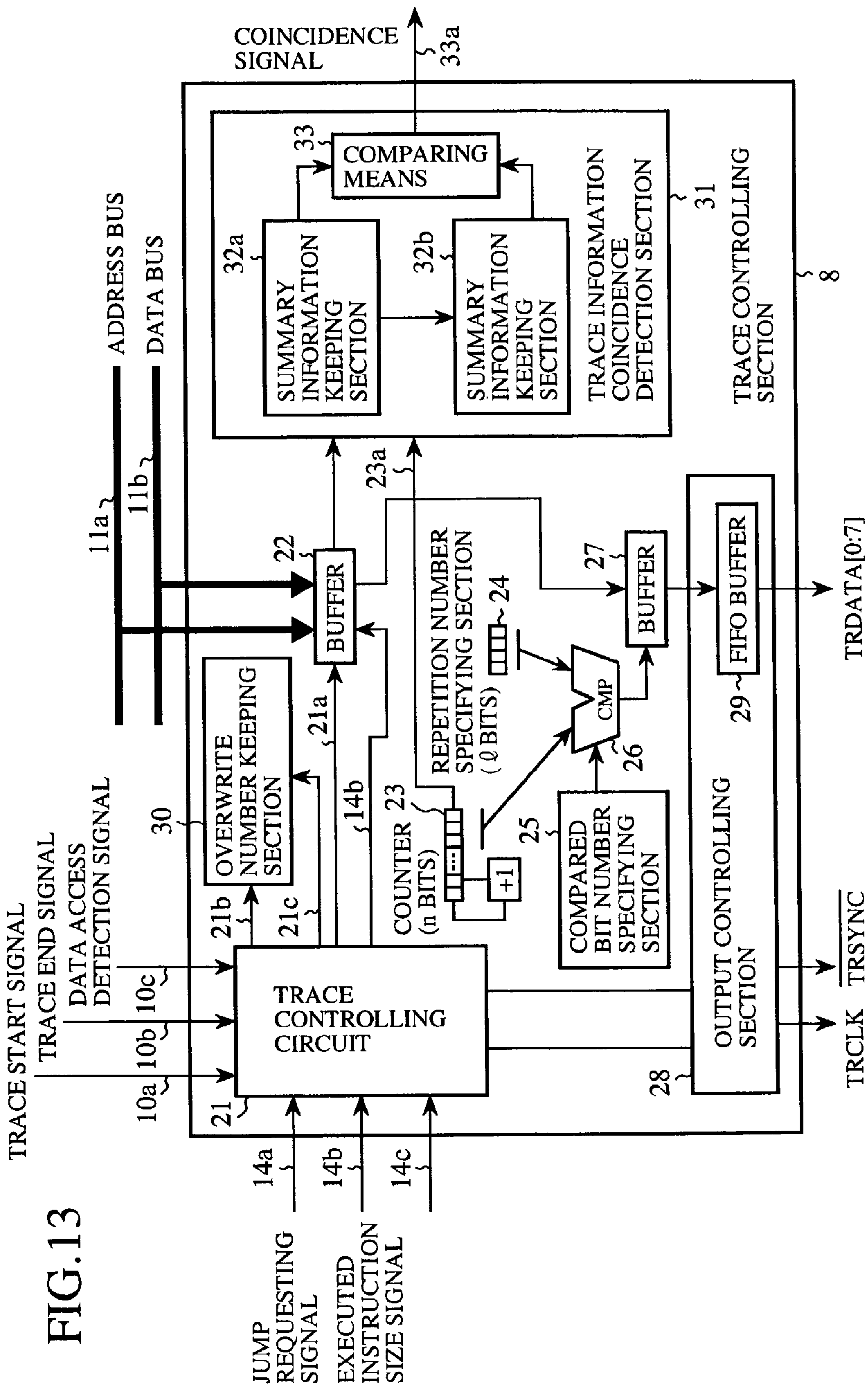
FIG. 13 is a block diagram showing a trace controlling section of a debugging system according to a fourth embodiment of the present invention.
Figure 14:
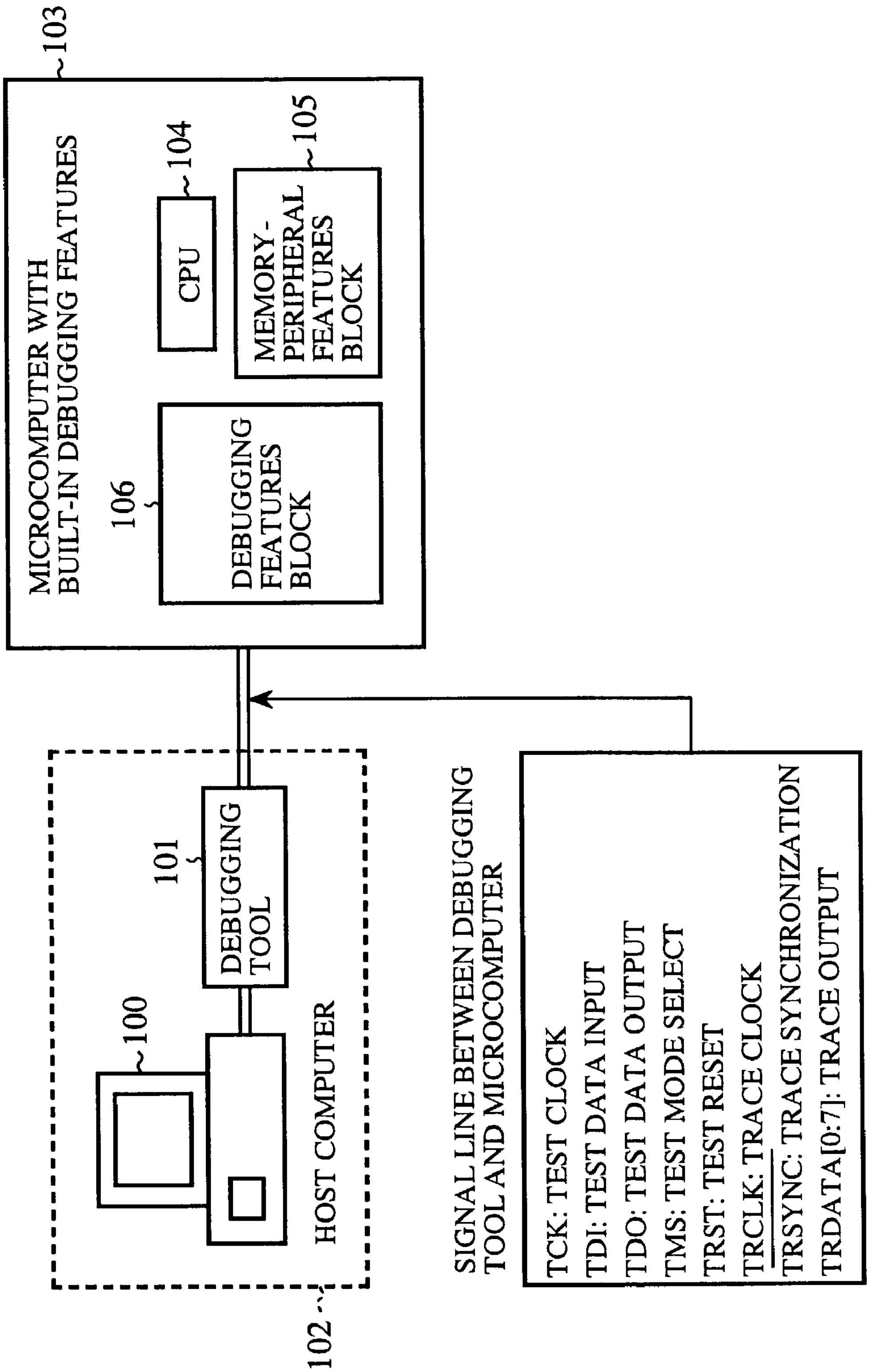
FIG. 14 is a diagram schematically showing a configuration of a conventional debugging system.
Figure 15:
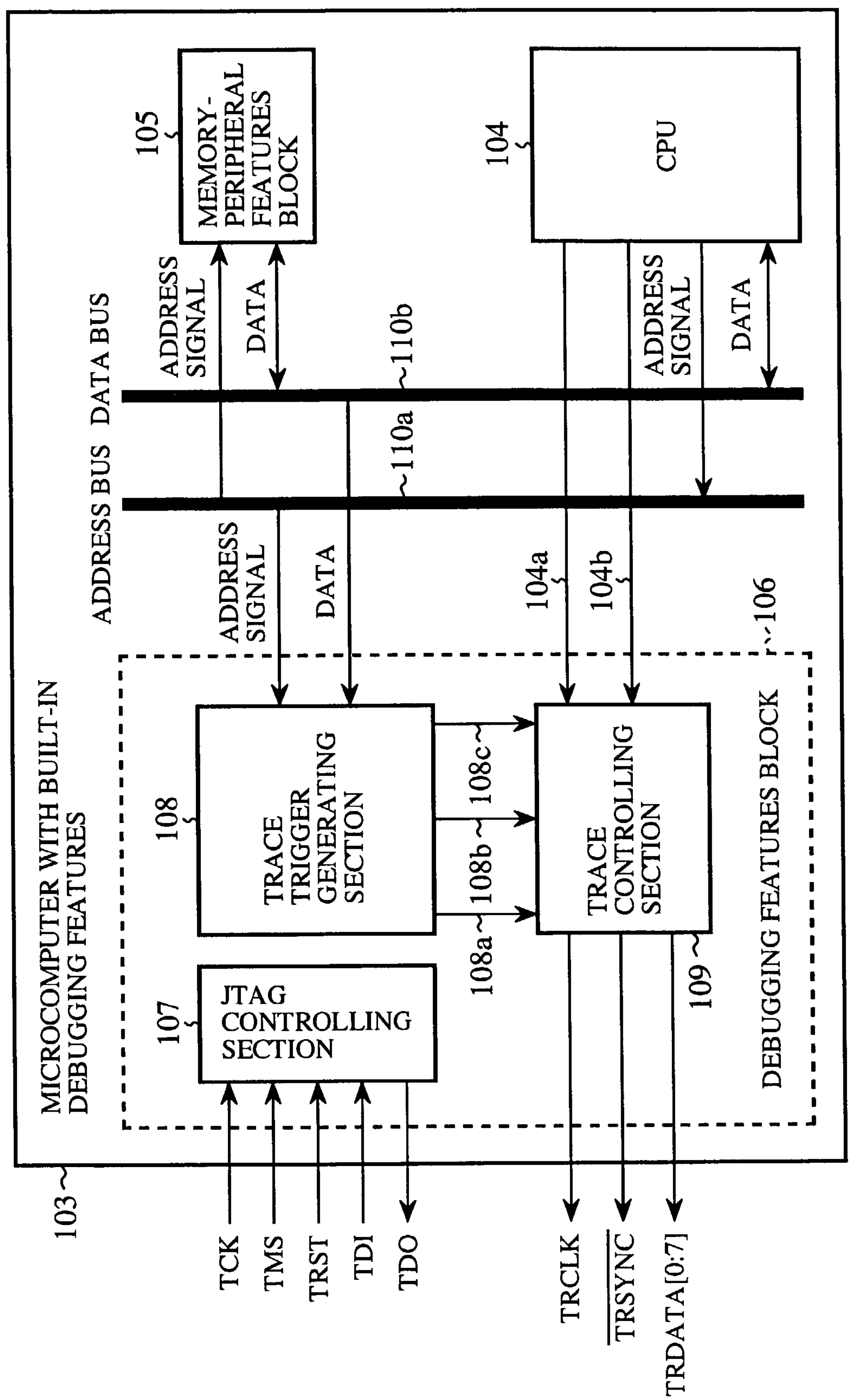
FIG. 15 is a block diagram showing a configuration of a microcomputer with built-in debugging features in FIG. 14.
Figure 16:
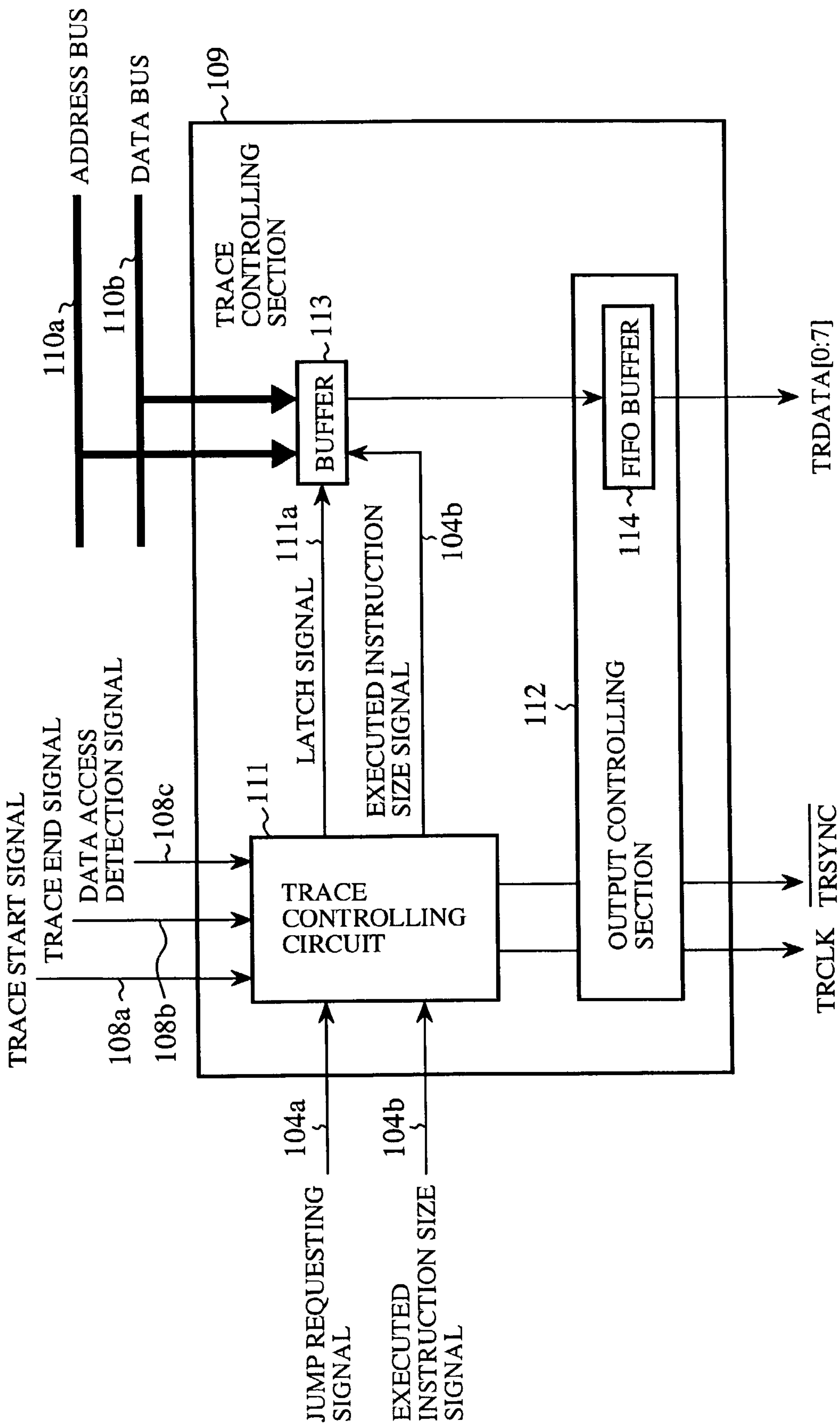
FIG. 16 is a block diagram showing a configuration of a trace controlling section in FIG. 15.

FIG. 13 is a block diagram showing a trace controlling section of a debugging system according to a fourth embodiment of the present invention. In this figure, an interruption processing signal 14*c* is output from the CPU 2 to the trace controlling section 8 to notify the trace controlling section 8 that the CPU 2 is in interruption process. Further, though an example is shown wherein a configuration according to the fourth embodiment is applied to the above third embodiment in FIG. 13, it may be also applied to the above first or second embodiment, as a matter of course. Here, it is to be noted that elements similar to those in FIG. 4 and FIG. 12 are given like reference numerals and description of these elements is omitted.

Next, an operation of the fourth embodiment will be described.

In the fourth embodiment, it is assumed that an instruction is issued to let the CPU 2 perform interruption processing in the program to be evaluated. More specifically, during the acquisition period of the trace information as shown in the above embodiments, when the CPU 2 performs the interruption processing, the interruption processing signal 14*c* is generated and output to the buffer 22 to indicate that the interruption processing is performed. The buffer 22 is configured so that it discontinues acquisition of the information from the internal buses 11*a*, 11*b* when it receives the interruption processing signal 14*c*. By such configuration, the trace information during the interruption process may be deleted.

In order to acquire the trace information in a split manner as described in the above embodiments, each of the trace information must be coincident every time it is generated. In this time, if the interruption processing is needed for operating the system using the microcomputer 1 but the trace information during the interruption processing itself is not necessary for debugging, it may be more likely that the trace information is coincident by ignoring the trace information generated during the interruption process.

As described above, in the fourth embodiment, since the buffer 22 is configured so that it discontinues acquisition of the information from the internal buses 11*a*, 11*b* when it receives the interruption processing signal 14*c*, it may be more likely that the trace information generated every time is coincident, the trace information may be acquired in a split manner with higher accuracy, and only the trace information that is necessary for debugging may be acquired.

Further, also at the period other than acquisition of the trace information, since the trace information during the interruption processing may be deleted as appropriate if it is not needed for debugging, efficient debugging without unwanted information may be performed.

As described above, according to the microcomputer of the present invention, since there is provided the collecting means for generating and collecting a series of the trace information for each execution process of the program to be evaluated in a preset sampling period for a predetermined number of repetitions; the outputting means for outputting the series of the trace information for each repetition; and the decimating means for deleting any of the trace information collected at each repetition so that the outputting means can output all of the trace information to be collected within the sampling period when the collecting means has finished repetitive collection process, there is an effect that the microcomputer may be obtained to acquire the trace information without overflow and without predicting the quantity of generated trace information.

According to the microcomputer of the present invention, since the decimating means further comprises the counting means for counting a predetermined cycle interval in the sampling period when the collecting means collects the trace information to delete the trace information generated within said predetermined cycle interval, there is an effect that the microcomputer that does not generate overflow of the trace information may be obtained by adding a simple mechanism.

According to the microcomputer of the present invention, since the counting means counts in synchronization with clock signals for collecting operation of the trace information or generation of the trace information, there is an effect that the microcomputer that does not generate overflow of the trace information may be obtained by adding a simple mechanism.

According to the microcomputer of the present invention, since the counting means has an external setting circuit for setting the cycle interval and/or a count starting point to delete the trace information from outside, there is an effect that the user can configure the setting for decimation of the trace information as appropriate.

According to the microcomputer of the present invention, since the discard number keeping means is further provided for counting and keeping the number of the trace information that has been generated and collected during output of previous trace information by the outputting means and therefore cannot be output in the collecting operation of the trace information by the collecting means in the collecting operation of the trace information by the collecting means, there is an effect that the microcomputer may be obtained to provide information about the number of the trace information that cannot be output as reference information for determining an appropriate repetition number.

According to the microcomputer of the present invention, the total number keeping means is further provided for counting and keeping the total number of the trace information generated within the sampling period in the collecting operation of the trace information by the collecting means, there is an effect that the microcomputer may be obtained to provide information about the total number of the trace information as reference information for determining an appropriate repetition number.

According to the microcomputer of the present invention, since the summary keeping means for generating and keeping summary information about the trace information generated within each sampling period, and the comparing means for comparing each of the summary information kept by said summary keeping means every time and outputting comparison results are provided, there is an effect that the microcomputer may be obtained to provide information for determining whether the program to be evaluated has been executed properly in each trace operation without installing a large amount of trace memory. Further, there is an effect that it is possible to ascertain whether the program runs stably and reproducibly by executing the program a plurality of times during the trace period.

According to the microcomputer of the present invention, since the summary information consists of the total number and/or a checksum of the trace information generated within the sampling period, there is an effect that the microcomputer may be obtained to construct the information to determine whether the evaluated program executed normally with smaller capacity.

According to the microcomputer of the present invention, since the summary information consists of a checksum of address information and/or data information included in the trace information generated within the sampling period, there is an effect that the microcomputer may be obtained to construct the information to determine whether the evaluated program executed normally with smaller capacity.

According to the microcomputer of the present invention, since the summary keeping means has an external setting circuit for initializing kept contents from outside, there is an effect that the microcomputer may be obtained to provide summary information that can be initialized by the user as appropriate.

According to the microcomputer of the present invention, since the means is further provided for deleting the trace information about interruption processing of the CPU in the collecting operation of the trace information by the collecting means, there is an effect that the microcomputer may be obtained wherein it may be more likely that the trace information is coincident, the trace information may be acquired in a split manner with higher accuracy, and only the trace information that is necessary for debugging may be acquired. Further, since the trace information during the interruption processing may be deleted as appropriate if it is not needed for debugging, there is an effect that efficient debugging without unwanted information may be performed.

According to the debugging system of the present invention, since there is provided the system for controlling debugging for the microcomputer that comprises: the collecting means for generating and collecting a series of trace information for each execution process of a program to be evaluated in a preset sampling period for a predetermined number of repetitions; the outputting means for outputting the series of the trace information for each repetition; and the decimating means for deleting any of the trace information collected at each repetition so that the outputting means can output all of the trace information to be collected within the sampling period when the collecting means has finished repetitive collection process, and comprises: the trace information reconstructing means for keeping the series of the trace information output from the outputting means for each repetition sequentially and for sorting the series of the information in an original generating order to construct the trace information which is to be collected over said sampling period entirely; and the debug controlling means for reading and/or configuring information about collection of the trace information for each means in the microcomputer and controlling debugging of the microcomputer using the trace information, there is an effect that the microcomputer may be obtained that can eliminate overflow of the trace information without predicting the quantity of the generated trace information and at the same time reconstruct given trace information from each of the trace information collected a plurality of times in a split manner regardless of the number of trace repetition, and therefore collect the trace information without overflow and without need to add the number of trace information output pins or increase operating frequency of the trace clock signal to speed up.

According to the debugging system of the present invention, since the decimating means comprises the counting means for counting a predetermined cycle interval in the sampling period when the collecting means collects the trace information and wherein the decimating means deletes the trace information generated within said predetermined cycle interval and the debug controlling means sets the cycle interval and/or count a starting point to delete the trace information, there is an effect that the debugging system that can set the information about the collection of the trace information in the microcomputer may be obtained by adding a simple mechanism.

According to the debugging system of the present invention, since the microcomputer further comprises the discard number keeping means for counting and keeping the number of the trace information that has been generated and collected during output of previous trace information by the outputting means and therefore cannot be output in the collecting operation of the trace information by the collecting means and the debug controlling means reads the number of the trace information that cannot be output from the discard number keeping means and then sets in the microcomputer the number of repetitions determined according to said number of the trace information, there is an effect that the debugging system may be obtained to determine the appropriate number of repetitions based upon the number of trace information that cannot be output.

According to the debugging system of the present invention, since the microcomputer further comprises the total number keeping means for counting and keeping the total number of the trace information generated within the sampling period in the collecting operation of the trace information by the collecting means and the debug controlling means reads the number of the trace information that cannot be output from the total number keeping means and then sets in the microcomputer the number of repetitions determined according to said total number of the trace information, there is an effect that the debugging system may be obtained to determine the appropriate number of repetitions based upon the total number of the trace information generated within the sampling period.

According to the debugging system of the present invention, since the microcomputer further comprises the summary keeping means for generating and keeping summary information about the trace information generated within each sampling period and the comparing means for comparing each of the summary information kept by said summary keeping means every time and outputting a comparison result and the debug controlling means determines identicalness of the trace information generated from the comparison result for each repetition and judges whether the program to be evaluated has been executed normally based upon said determination, there is an effect that the debugging system may be obtained wherein the debugging system can acquire information to determine whether the evaluated program has been executed normally for each trace without installing a large amount of trace memory and can control the debugging while ascertaining whether the program runs stably and reproducibly by executing the program a plurality of times during the trace period.

According to the trace information collecting method of the present invention, since the method for collecting trace information for each execution process of a program to be evaluated by the microcomputer is provided, wherein the method comprises the steps of: generating and collecting a series of the trace information for each execution process of the program to be evaluated in a preset sampling period for a predetermined number of repetitions; deleting any of the trace information collected at each repetition so that all of the trace information to be collected within the sampling period can be output when the repetitive collection process has finished in the collecting step; outputting the remainder of the trace information that has not been deleted for every repetition; and reconstructing the trace information which is to be collected over the sampling period entirely by keeping the series of the trace information output in the outputting step for each repetition sequentially and sorting the series of the information in an original generating order, there is an effect that the overflow of the trace information may be eliminated without predicting the quantity of generated trace information. Further, since given trace information may be reconstructed from each of the trace information collected a plurality of times regardless of the number of the repetition of the trace, there is an effect that the trace information may be collected without overflow and without need to add the number of trace information output pins or increase operating frequency of the trace clock signal to speed up.

What is claimed is:

1. A microcomputer comprising:

collecting means for generating and collecting a series of trace information for each execution process of a program to be evaluated within a preset sampling period for a predetermined number of repetitions;

outputting means for outputting the series of the trace information for each repetition; and decimating means for deleting any of the trace information collected at each repetition so that said outputting means can output all of the trace information to be collected within said sampling period when said collecting means has finished repetitive collection process, wherein the decimating means further comprises counting means for counting a predetermined cycle interval in the sampling period when the collecting means collects the trace information, so as to delete the trace information generated within said predetermined cycle interval.

2. A microcomputer according to claim 1, wherein the counting means counts in synchronization with clock signals for collecting operation of the trace information or generation of the trace information.

3. A microcomputer according to claim 1, wherein the counting means has an external setting circuit for setting the cycle interval and/or a count starting point to delete the trace information from outside.

4. A microcomputer according to claim 1, further comprising discard number keeping means for counting and keeping the number of the trace information that has been generated and collected during output of previous trace information by the outputting means and therefore cannot be output in the collecting operation of the trace information by the collecting means.

5. A microcomputer according to claim 1, further comprising total number keeping means for counting and keeping the total number of the trace information generated within the sampling period in the collecting operation of the trace information by the collecting means.

6. A microcomputer according to claim 1, further comprising:

summary keeping means for generating and keeping summary information about the trace information generated within each sampling period; and comparing means for comparing each of the summary information kept by said summary keeping means every time and outputting the result of said comparison.

7. A microcomputer according to claim 6, wherein the summary information consists of the total number and/or a checksum of the trace information generated within the sampling period.

8. A microcomputer according to claim 7, wherein the summary information consists of a checksum of address information and/or data information included in the trace information generated within the sampling period.

9. A microcomputer according to claim 6, wherein the summary keeping means has an external setting circuit for initializing kept contents from outside.

10. A microcomputer according to claim 1, further comprising means for deleting the trace information about interruption processing of the CPU in the collecting operation of the trace information by the collecting means.

11. A debugging system for controlling debugging for a microcomputer that comprises: collecting means for generating and collecting a series of trace information for each execution process of a program to be evaluated within a preset sampling period for a predetermined number of repetitions; outputting means for outputting the series of the trace information for each repetition; and decimating means for deleting any of the trace information collected at each repetition so that said outputting means can output all of the trace information to be collected within said sampling period when said collecting means has finished all of the repetitive collection process, said debugging system comprising:

trace information reconstructing means for keeping the series of the trace information output from said outputting means for each repetition sequentially and for sorting the series of the information in an original generating order to construct the trace information which is to be collected over said sampling period entirely; and debug controlling means for reading and/or configuring information about collection of the trace information for each means in said microcomputer and controlling debugging of said microcomputer using said trace information, wherein the decimating means comprises counting means for counting a predetermined cycle interval within the sampling period when the collecting means collects the trace information and the decimating means deletes the trace information generated within said predetermined cycle interval; and the debug controlling means sets the cycle interval and/or a count starting point to delete the trace information in said counting means.

12. A debugging system according to claim 11, wherein the microcomputer further comprises discard number keeping means for counting and keeping the number of the trace information that has been generated and collected during output of previous trace information by the outputting means and therefore cannot be output in the collecting operation of the trace information by the collecting means; and the debug controlling means reads the number of the trace information that cannot be output from said discard number keeping means and then sets in said microcomputer the number of repetitions determined according to said number of the trace information.

13. A debugging system according to claim 11, wherein the microcomputer further comprises total number keeping means for counting and keeping the total number of the trace information generated within the sampling period in the collecting operation of the trace information by the collecting means; and the debug controlling means reads the number of the trace information that cannot be output from said total number keeping means and then sets in said microcomputer the number of repetitions determined according to said total number of said trace information.

14. A debugging system according to claim 11, wherein the microcomputer further comprises summary keeping means for generating and keeping summary information about the trace information generated within each sampling period and comparing means for comparing each of the summary information kept by said summary keeping means every time and outputting a result of said comparison; and the debug controlling mans determines identicalness of the trace information generated from said comparison result for each repetition and judges whether the program to be evaluated has been executed normally based upon said determination.

* * * * *